(12) United States Patent
Ludwiczak

(10) Patent No.: US 8,087,297 B2
(45) Date of Patent: Jan. 3, 2012

(54) VIBRATING DEBRIS REMOVER

(76) Inventor: Damian R. Ludwiczak, Medina, OH (US)

( * ) Notice: Subject to any disclaimer, the term of this patent is extended or adjusted under 35 U.S.C. 154(b) by 438 days.

(21) Appl. No.: 12/336,622

(22) Filed: Dec. 17, 2008

(65) Prior Publication Data

US 2009/0120471 A1    May 14, 2009

Related U.S. Application Data

(63) Continuation-in-part of application No. 11/858,680, filed on Sep. 20, 2007, now Pat. No. 7,770,453, which is a continuation-in-part of application No. 11/461,667, filed on Aug. 1, 2006, now Pat. No. 7,459,831, which is a continuation of application No. 10/949,613, filed on Sep. 24, 2004, now Pat. No. 7,084,553.

(60) Provisional application No. 60/550,567, filed on Mar. 4, 2004.

(51) Int. Cl.
*G01N 29/00* (2006.01)
*H01L 41/083* (2006.01)

(52) U.S. Cl. .............. 73/584; 73/600; 73/658; 310/321; 310/323.19

(58) Field of Classification Search .................... 73/583, 73/584, 579, 600, 602, 658; 310/323.01, 310/328, 321, 323.19
See application file for complete search history.

(56) References Cited

U.S. PATENT DOCUMENTS

| | | | |
|---|---|---|---|
| 3,008,232 A | 11/1961 | Shea, Jr. | |
| 3,171,683 A | 3/1965 | Ludwig | |
| 3,395,414 A | 8/1968 | Malin | |
| 3,530,577 A | 9/1970 | Franklin et al. | |
| 3,793,723 A | 2/1974 | Kuris et al. | |
| 3,916,699 A * | 11/1975 | Moran et al. | 73/623 |
| 4,038,571 A | 7/1977 | Hellenkamp | |
| 4,231,155 A | 11/1980 | Johne | |
| 4,286,383 A | 9/1981 | Farden | |
| 4,349,143 A | 9/1982 | Ewig | |
| 4,381,604 A | 5/1983 | Horst | |
| 4,387,973 A | 6/1983 | Martin | |
| 4,432,117 A | 2/1984 | Iskiw | |

(Continued)

FOREIGN PATENT DOCUMENTS

DE    296 21 783 U1    5/1998

(Continued)

OTHER PUBLICATIONS

Ultrasound Technology—Aircraft Anti-Icing and Deicing Protection, "Aircraft Anti-Icing and Deicing Protection Using Ultrasound Technology", website page, May 1997.

(Continued)

*Primary Examiner* — J M Saint Surin
(74) *Attorney, Agent, or Firm* — Hahn Loeser & Parks LLP

(57) ABSTRACT

A system and a retrofit kit for removing debris from a surface of a material. At least one vibration subunit is provided which is either embedded within or operatively connected to a back surface of the material. The vibration subunits are capable of converting a driving energy to a vibrating mechanical output energy which is coupled to the material. At least one external energy source is provided which is operatively connected to the vibration subunits. The external energy source is capable of providing the driving energy to the vibration subunits. The vibrating mechanical energy is capable of causing debris to be removed from the surface of the material.

29 Claims, 38 Drawing Sheets

U.S. PATENT DOCUMENTS

| | | |
|---|---|---|
| 4,466,851 A | 8/1984 | Hoffman |
| 4,592,237 A * | 6/1986 | Ogura et al. .................. 73/602 |
| 4,609,368 A | 9/1986 | Dotson, Jr. |
| 4,732,351 A | 3/1988 | Bird |
| 4,744,144 A | 5/1988 | Lowery et al. |
| 4,833,373 A | 5/1989 | Doi et al. |
| 4,858,264 A | 8/1989 | Reinhart |
| 4,929,072 A | 5/1990 | Fujie et al. |
| 5,007,722 A | 4/1991 | Mori et al. |
| 5,025,187 A | 6/1991 | Fujie et al. |
| 5,037,189 A | 8/1991 | Fujie et al. |
| 5,132,840 A | 7/1992 | Okada et al. |
| 5,136,425 A | 8/1992 | Fujie et al. |
| 5,148,312 A | 9/1992 | Kawai et al. |
| 5,155,625 A | 10/1992 | Komatsu et al. |
| 5,170,288 A | 12/1992 | Imaizumi et al. |
| 5,172,024 A | 12/1992 | Broussoux et al. |
| 5,287,582 A | 2/1994 | Kawai et al. |
| 5,323,265 A | 6/1994 | Fujie et al. |
| 5,475,530 A | 12/1995 | Fujie et al. |
| 5,548,175 A | 8/1996 | Tamai |
| 5,724,186 A | 3/1998 | Collier |
| 5,795,094 A * | 8/1998 | McKague et al. ............ 403/335 |
| 5,930,899 A | 8/1999 | Hartman et al. |
| 6,378,377 B2 * | 4/2002 | Matuseski et al. ............... 73/627 |
| 6,570,295 B2 | 5/2003 | Herrmann et al. |
| 6,624,539 B1 | 9/2003 | Hansen et al. |
| 6,743,298 B2 | 6/2004 | Schmid |
| 6,748,808 B2 * | 6/2004 | Lam et al. ...................... 73/622 |
| 7,084,553 B2 | 8/2006 | Ludwiczak |
| 2004/0035912 A1 | 2/2004 | Li et al. |
| 2010/0031972 A1 | 2/2010 | Royer, Jr. et al. |

FOREIGN PATENT DOCUMENTS

| | | |
|---|---|---|
| DE | 198 26 168 A1 | 8/1999 |
| DE | 100 05 341 A1 | 8/2001 |
| DE | 100 33 382 A1 | 1/2002 |
| WO | 2005/086572 A2 | 9/2005 |
| WO | 2005/086572 A3 | 5/2006 |

OTHER PUBLICATIONS

CTS Fahrzeug-Gachsysteme GmbH—DE 1 000 5341—Derwent World Patents Index, File No. 351, Accession No. 14068452, 2 pgs.

Daimler Chrysler AG—DE 1 982 6168—Derwent World Patents Index, File No. 351, Accession No. 12722932m 2 pgs.

Hohe GmbH & Co KG—DE 2 962 1783—Derwent World Patents Index, File No. 351, Accession No. 11815069, 1 pg.

Jose L. Palacios, Edward C. Smith, Joseph L. Rose, "Investigation of an Ultrasonic Ice Protection System for Helicopter Rotor Blades", American Helicopter Society International, Inc., presented at the American Helicopter Society 64th Annual Forum, Montreal, Canada, Apr. 29-May 1, 2008, pp. 1-10.

* cited by examiner

FIG. 2
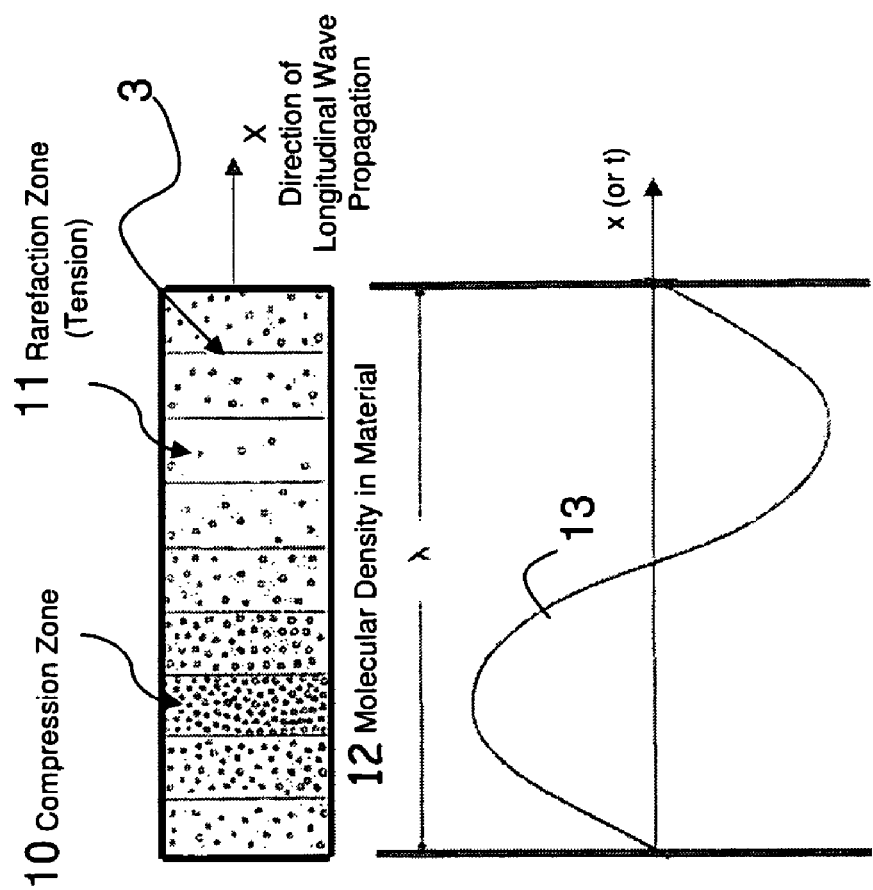
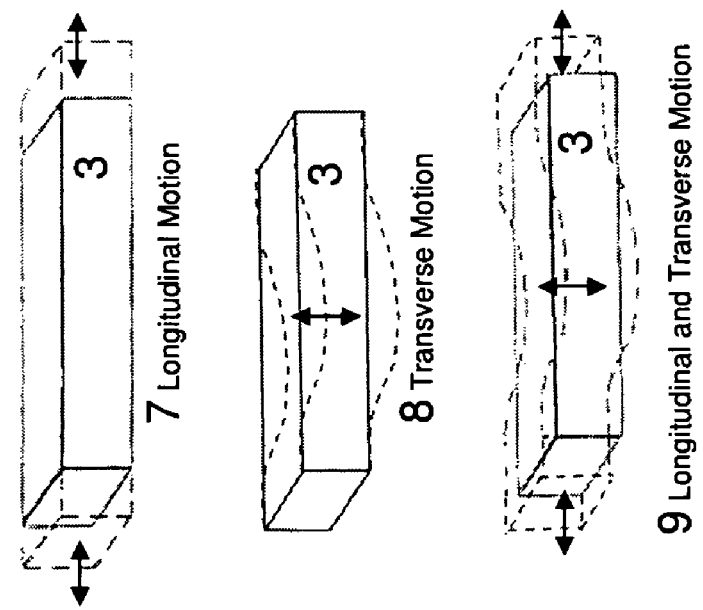

VIBRATING DEBRIS REMOVER

CROSS-REFERENCE TO RELATED APPLICATIONS/INCORPORATION BY REFERENCE

This U.S. patent application is a continuation-in-part of and claims priority to pending U.S. patent application Ser. No. 11/858,680 filed on Sep. 20, 2007 which is incorporated herein by reference in its entirety, and which is a continuation-in-part of pending U.S. patent application Ser. No. 11/461,667 filed on Aug. 1, 2006 which is incorporated herein by reference in its entirety, and which is a continuation of U.S. patent application Ser. No. 10/949,613 filed on Sep. 24, 2004 (now U.S. Pat. No. 7,084,553) which is incorporated herein by reference in its entirety, and which claims the benefit of provisional U.S. patent application Ser. No. 60/550,567 filed on Mar. 4, 2004.

GOVERNMENT INTEREST

This invention was made by an employee of the United States Government. The Government has a nonexclusive, irrevocable, royalty-free license in the invention with power to grant licenses for all governmental purposes.

TECHNICAL FIELD

Certain embodiments of the present invention relate to debris removal. More particularly, certain embodiments of the present invention relate to systems and retrofit kits for removing debris adhered to a surface of a material.

BACKGROUND

It is important for the safe operation of any vehicle that a clear, unobstructed view to the outside environment be maintained. An example of such viewing need is for the driver of an automobile. In this application, material such as the windshield, side windows, rearview mirrors, and rear windows have a surface exposed to the outside weather elements where rain, snow, ice, and other debris can accumulate. The accumulation of this debris poses a significant problem with maintaining a clear view to the outside environment.

In prior art, one method used to remove solid debris such as ice from a material surface consists of a device which blows hot air on the material's interior surface or heats the material surface by the Joule effect through metal wires attached to the material. A major drawback to these devices is that the time it takes to remove the debris is significant. Also, the field of view is obstructed with the metal wire technology.

In other prior art, another method used to remove debris such as ice and/or liquid from a material surface consists of only mounting transducer elements, which vibrate, directly onto the material surface. The transducer elements are made from piezoelectric or magnetostrictive material and electrical energy is used to make these elements vibrate. Such devices are described in U.S. Pat. Nos. 5,724,186; 5,155,625; 5,132,840; 5,148,312; 5,037,189; 5,007,722; 4,833,373; 5,136,425; 5,025,187; and 5,172,024. A major drawback of these devices is that the vibrating transducer elements mount perpendicular and directly on the material surface. Because the vibrating transducer elements are attached in this manner, the magnitude of the vibrations developed by the transducer elements cannot be changed, and in particular magnified, prior to entering into the material. This results in a design which is very inefficient because of the amount of energy required to generate the necessary vibration amplitude in the material to remove the unwanted debris. Another drawback of these devices is that the dimensions of the vibrating transducers have to be carefully chosen such that their natural vibration frequency is tuned to that of the material in order to be efficient. Additionally, some of the above referenced devices are mounted on the material surface in such a way that the field of view through the material can be highly obstructed if applied in the use of windshield or side windows for removing debris.

Further limitations and disadvantages of conventional, traditional, and proposed approaches will become apparent to one of skill in the art, through comparison of such systems and methods with the present invention as set forth in the remainder of the present application with reference to the drawings.

SUMMARY

A device, that when attached along the edge of a material, such as a vehicular window, will propagate mechanical vibration or shock motion created by the device into the material with sufficient magnitude in order to remove solid debris, such as ice, and/or liquid debris, such as water, from the surface of the material is disclosed. With the addition of a pulser/receiver and/or a frequency spectrum electronic unit, the device could also function as a debris detector. Additional vibrator subunits could also be attached to the material surface or embedded in the material to either augment the converter and coupler units vibration energy source or to provide an alternate vibration energy source if the converter and coupler units were inactive or unattached. Certain embodiments of the present invention shall be described chiefly with respect to an application for the detection/removal of ice and/or water from the windshield of an automobile. However, it will be easily understood that the described application of the device is in no way restrictive to a great many other applications in which the detection/removal of debris from other types of material surfaces may be required. Some examples of other applications include ice detection/removal from aircraft wings, wind turbine blades, adhesive removal on/or between two materials, cookware cleaning, and the removal of paint from a material surface.

An embodiment of the present invention comprises a system for removing debris from a surface. The system includes a material from which debris is to be removed. The material has a front surface capable of having debris attached thereto, and an opposing back surface. The system further includes at least one vibration subunit operatively connected to the opposing back surface and capable of converting a driving energy to a vibrating mechanical output energy which is coupled into the material. The system also includes at least one external energy source connected to the at least one vibration subunit. The at least one external energy source is capable of providing the driving energy to the at least one vibration subunit. The system may further include a pulser/receiver unit or a frequency spectrum electronic unit operatively connected to the at least one vibration subunit and capable of detecting at least one of debris on the front surface of the material and damage to the material.

The system may further include a converter unit capable of producing mechanical motion at an output, and a coupler having a first end and a second end, the first end being operatively associated with the converter output and capable of transmitting the mechanical motion produced by the converter unit, the second end being adapted to attach to an edge of the material. The system may further include a pulser/ receiver unit or a frequency spectrum electronic unit operatively connected to the converter unit and capable of detecting at least one of debris on the front surface of the material and damage to the material.

The at least one vibration subunit may include a piezoelectric actuator device capable of converting electrical energy provided by the at least one external energy source to vibrating mechanical energy. In accordance with an embodiment of the present invention, the piezoelectric actuator device is further capable of converting deflecting mechanical energy, provided by the material, to electrical energy and storing the electrical energy. As an alternative, the at least one vibration subunit may include a pneumatic actuator device capable of converting pneumatic energy provided by the at least one external energy source to vibrating mechanical energy. As a further alternative, the at least one vibration subunit may include a hydraulic actuator device capable of converting hydraulic energy provided by the at least one external energy source to vibrating mechanical energy.

In accordance with certain embodiments of the present invention, the material forms one of at least a portion of a windshield, at least a portion of an aircraft wing or tail, at least a portion of an air foil, at least a portion of a wind turbine blade, at least a portion of a helicopter rotor blade, and at least a portion of a refrigeration coil cooling fin. The material may include at least one of glass, metal, and a composite material, for example. The debris may include ice, for example.

In accordance with an embodiment of the present invention, the at least one vibration subunit is operatively connected at a vibration node of the material on the opposing back surface.

Another embodiment of the present invention comprises a system for removing debris from a surface. The system includes a material from which debris is to be removed. The material has a front surface capable of having debris attached thereto. The system further includes at least one vibration subunit operatively embedded within the material and capable of converting a driving energy to a vibrating mechanical energy which is coupled into the material. The system also includes at least one external energy source connected to the at least one embedded vibration subunit. The at least one external energy source is capable of providing the driving energy to the at least one embedded vibration subunit. The system may further include a pulser/receiver unit or a frequency spectrum electronic unit operatively connected to the at least one embedded vibration subunit and capable of detecting at least one of debris on the front surface of the material and damage to the material.

The system may further include a converter unit capable of producing mechanical motion at an output, and a coupler having a first end and a second end, the first end being operatively associated with the converter output and capable of transmitting the mechanical motion produced by the converter unit, the second end being adapted to attach to an edge of the material. The system may further include a pulser/receiver unit or a frequency spectrum electronic unit operatively connected to the converter unit and capable of detecting at least one of debris on the front surface of the material and damage to the material.

The at least one embedded vibration subunit may include a piezoelectric actuator device capable of converting electrical energy provided by the at least one external energy source to vibrating mechanical energy. In accordance with an embodiment of the present invention, the piezoelectric actuator device is further capable of converting deflecting mechanical energy, provided by the material, to electrical energy and storing the electrical energy. As an alternative, the at least one embedded vibration subunit may include a pneumatic actuator device capable of converting pneumatic energy provided by the at least one external energy source to vibrating mechanical energy. As a further alternative, the at least one embedded vibration subunit may include a hydraulic actuator device capable of converting hydraulic energy provided by the at least one external energy source to vibrating mechanical energy.

In accordance with certain embodiments of the present invention, the material forms one of at least a portion of a windshield, at least a portion of an aircraft wing or tail, at least a portion of an air foil, at least a portion of a wind turbine blade, at least a portion of a helicopter rotor blade, and at least a portion of a refrigeration coil cooling fin. The material may include at least one of glass, metal, and a composite material, for example. The debris may include ice, for example.

In accordance with an embodiment of the present invention, the at least one vibration subunit is operatively embedded at a vibration node within the material.

A further embodiment of the present invention comprises a retrofit kit for a material forming at least one of a windshield, an aircraft wing or tail, an air foil, a wind turbine blade, a helicopter rotor blade, and a refrigeration coil cooling fin. The retrofit kit includes a plurality of vibration subunits adapted to be operatively connected to a back surface of the material and capable of converting a driving energy to a vibrating mechanical output energy which is coupled into the material. The retrofit kit further includes an adhesive capable of mechanically and acoustically coupling the plurality of vibration subunits to the material. The retrofit kit also includes at least one external energy source capable of being connected to the plurality of vibration subunits. The at least one external energy source is capable of providing the driving energy to the plurality of vibration subunits. The retrofit kit further includes a plurality of connectors to connect the at least one external energy source to the plurality of vibration subunits to channel the driving energy from the at least one external energy source to the plurality of vibration subunits. The retrofit kit may also include a pulser/receiver unit or a frequency spectrum electronic unit capable of being operatively connected to at least one of the plurality of vibration subunits and capable of detecting at least one of debris on a surface of the material and damage to the material.

The retrofit kit may further include a converter unit capable of producing mechanical motion at an output, and a coupler having a first end and a second end, the first end being operatively associated with the converter output and capable of transmitting the mechanical motion produced by the converter unit, the second end being adapted to attach to an edge of the material. The retrofit kit may also include a pulser/receiver unit or a frequency spectrum electronic unit capable of being operatively connected to the converter unit and capable of detecting at least one of debris on a surface of the material and damage to the material.

In accordance with an embodiment of the present invention, the plurality of vibration subunits may be operatively connected at vibration nodes of the material on the back surface.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 2—Various types of mechanical vibration waveforms present in material;

DETAILED DESCRIPTION

Figure 1:
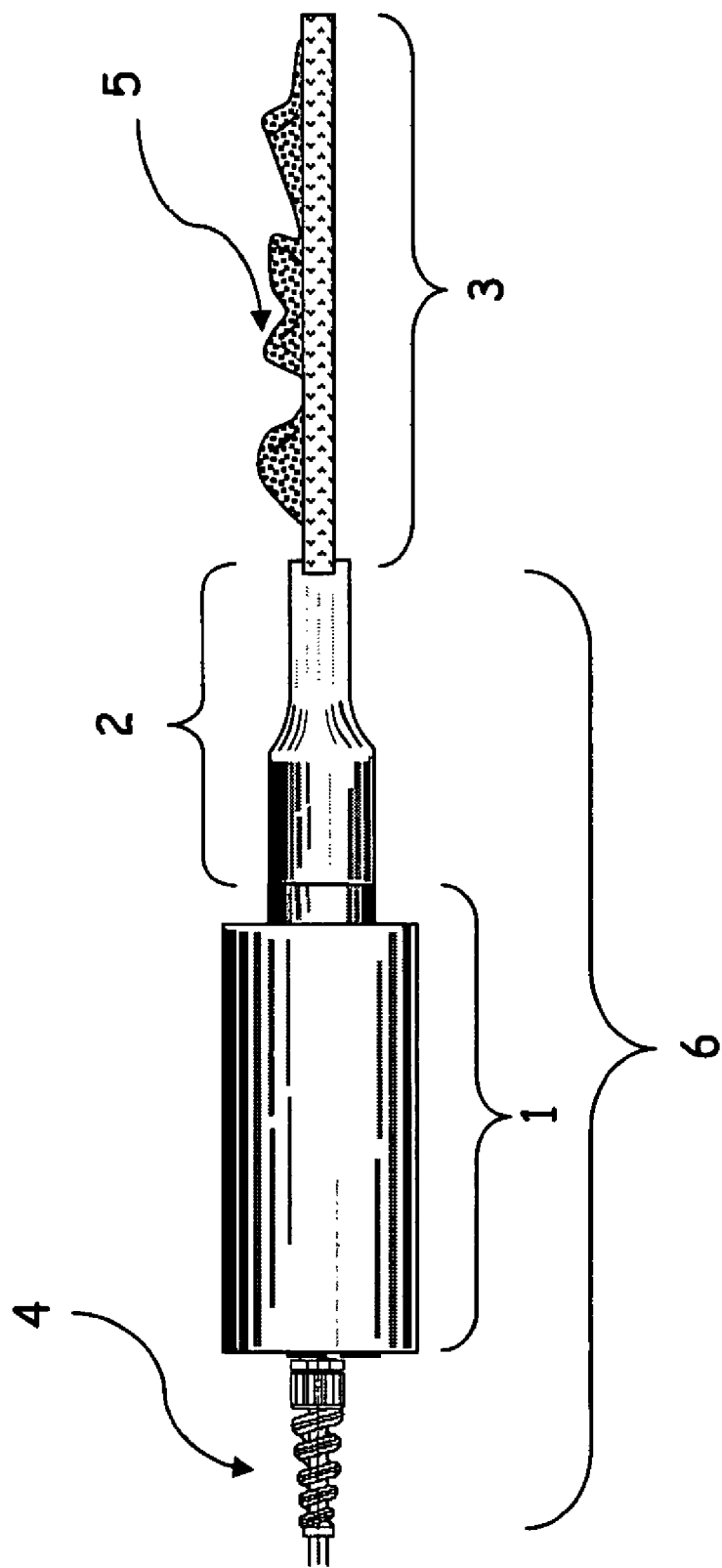
FIG. 1—Vibrating Debris Remover attached to a material with debris.

Certain embodiments of the present invention relate to a device which is either permanently attached or removable to the edge of a material such as a vehicular glass window or the leading edge of an aircraft or wind turbine airfoil. This device is comprised of two units, a converter sub-unit (vibrator) and a coupler sub-unit. A pulser/receiver and/or a frequency spectrum electronic unit could be attached the converter sub-unit such that the device could also function as a debris detector. Additional vibrator subunits such as but not limited to piezoelectric actuators, could also be attached to the underside of a material surface or embedded in the material to either augment the converter and coupler units vibration energy source or to provide an alternate vibration energy source if the converter and coupler units were inactive or unattached. The converter sub-unit (vibrator) and a coupler sub-unit are arranged so as to propagate mechanical motion generated by the converter sub-unit through the coupler sub-unit and into the edge of the attached material. The additional vibrator subunits are strategically placed at very specific locations on the material or imbedded internal to the material to augment or serve as a backup vibration energy source to the mechanical motion generated by the converter sub-unit through the coupler sub-unit and into the edge of the attached material. The resulting vibration motion in the material, which could take the form of a longitudinal compression/rarefaction wave, transverse wave, or a combination of the two waveforms, is of a sufficient magnitude so as to cause the adhesive bond between the material's surface and other solid debris, such as ice, to be quickly broken. This allows the debris to fall away while not damaging the material or the additional vibrator subunits. The vibration motion in the material is also of sufficient magnitude to remove a liquid such as water from the material surface.

The converter sub-unit converts an energy source such as electrical, pneumatic, or fluid (e.g., hydraulic) into mechanical vibration or shock pulse motion. The coupler sub-unit transfers the mechanical motion generated by the converter sub-unit into the attached material. Also, the coupler sub-unit can be designed to reduce, magnify, or keep constant the amplitude of the converter sub-unit mechanical motion before it enters the material. The design of the converter sub-unit and the geometric configuration and material properties of the coupler sub-unit are related specifically to the material characteristics and physical dimensions of the material to which they are attached, i.e. an automotive windshield. The additional vibrator subunits convert an energy source such as electrical or pneumatic into mechanical vibration or shock pulse motion and do not need to be related specifically to the material characteristics and physical dimensions of the material to which they are attached.

In an attempt to maintain a clear view to the outside environment a device, utilizing mechanical vibrations, has been developed. This device, which is either removable or permanently attached to the edge of a material, is comprised of two sub-units. These are the converter sub-unit and the coupler sub-unit. The converter sub-unit converts an energy source such as electrical, pneumatic, or fluid into mechanical vibration or shock pulse motion. If the converter sub-unit utilizes a piezoelectric crystal to convert electrical energy into mechanical motion, it could be attached to a pulser/receiver and/or a frequency spectrum electronic unit to be used as a debris detector. Additional vibrator subunits could also be attached along the material surface or embedded in the material to either augment the converter and coupler units vibration energy source or to provide an alternate vibration energy source if the convertor and coupler units were inactive or unattached. If the additional vibrator sub-units also utilize a piezoelectric material to convert electrical energy into mechanical motion, they could also be attached to a pulser/receiver and/or a frequency spectrum electronic unit to be used as a debris detector.

The coupler sub-unit transfers the mechanical motion generated by the converter sub-unit into the attached material. Also, the coupler sub-unit can be designed to reduce, magnify, or keep constant the amplitude of the converter sub-unit mechanical motion before it enters the material.

Accordingly, the intent of the claimed invention is to overcome the drawbacks of prior art methods used for the removal of debris from a material surface. To achieve this intent and in accordance with the principles of embodiments of the present invention as embodied and broadly described herein, the device is comprised of two sub-units, a converter sub-unit and a coupler sub-unit. These two sub-units are used together to propagate vibrations into the edge of a material causing the material to vibrate. Additional vibrator subunits could also be attached to the material surface or embedded in the material to either augment the converter and coupler units vibration energy source or to provide an alternate vibration energy source if the converter and coupler units were inactive or unattached. In the case of the additional vibrators being embedded in the material, these vibrators will also attach to two edges of the material. Because the material is vibrating, the removal of the debris is achieved by breaking the adhesive bond existing between the material surface and the undesired debris. This is done without harming the material or additional vibrator subunits and can be done without obstructing the view through the material surface such as an automotive windshield.

Therefore, certain embodiments of the present invention provide a system for removing ice, water, or other debris from a material surface, by causing vibrations in the material. The vibrations in the material are the result of mechanical vibration or shock motion entering into the edge of the material through the use of a coupler sub-unit. Additional vibrator subunits could also be attached to the material surface or embedded in the material to either augment the existing vibrations in the material or to provide an alternate vibration energy source if the converter and coupler units were inactive or unattached. If the additional vibrators subunits are embedded in the material, these vibrator subunits will also be attached to two edges of the material. This is unlike prior art methods in which devices are only attached perpendicular to the material surface.

Certain embodiments of the present invention also provide a debris removal system in which the vibration frequency is adjustable, if required, for matching the resonating vibration frequency of the material with debris attached. With the addition of a pulser/receiver and/or a frequency spectrum electronic unit attached to either the converter sub-unit or the additional vibrator subunits, the device could also function as a debris detector by detecting vibration pulse delays or vibration spectrum frequency shifts.

The concern for the removal of debris from a material is very real. Certain embodiments of the present invention shall be described with respect to an automotive windshield. However, this should in no way be restrictive to a great many other materials and applications to which this debris removal device could be employed.

As shown in FIG. 1, some type of debris 5, such as ice and or water, can build on a material 3 surface, such as an automobile windshield, to a level where visibility to the outside environment is impaired. This results in a dangerous operating condition. A vibrating debris remover 6 has been developed that can remove debris 5, such as ice, from a material 3 surface, such as an automotive windshield. The vibrating debris remover 6 consists of two parts, the converter sub-unit 1 and the coupler sub-unit 2 to which the material 3 is attached.

The converter sub-unit 1 and coupler sub-unit 2 are so arranged as to propagate mechanical vibration or shock pulse motion generated by the converter sub-unit 1 into the coupler sub-unit 2 and then into the edge of the material 3. The coupler sub-unit 2 can be designed to reduce, magnify, or keep constant the amplitude of the converter sub-unit's 1 mechanical vibration or shock pulse motion before it enters the material 3 to which is attached some debris 5 particle.

The resulting vibrations 13 in the material 3 will be in the form of a longitudinal 7 motion, transverse 8 motion, or a combination 9 of the two based on how the coupler sub-unit 2 is attached to the material 3. The longitudinal 7 motion in the material 3 is the result of compressions 10 and rarefactions 11 in the material's molecular density 12. The longitudinal 7 motion, transverse 8 motion, or a combination 9 of the two in the material 3 is of a sufficient magnitude and strain rate such that the adhesive bond between the material 3 and debris 5 is quickly broken allowing the debris 5 to fall away while not damaging the material 3. The vibrations 13 in the material 3 are also of sufficient magnitude as to cause water droplets 5 to leave the material 3 surface.

Figure 3:
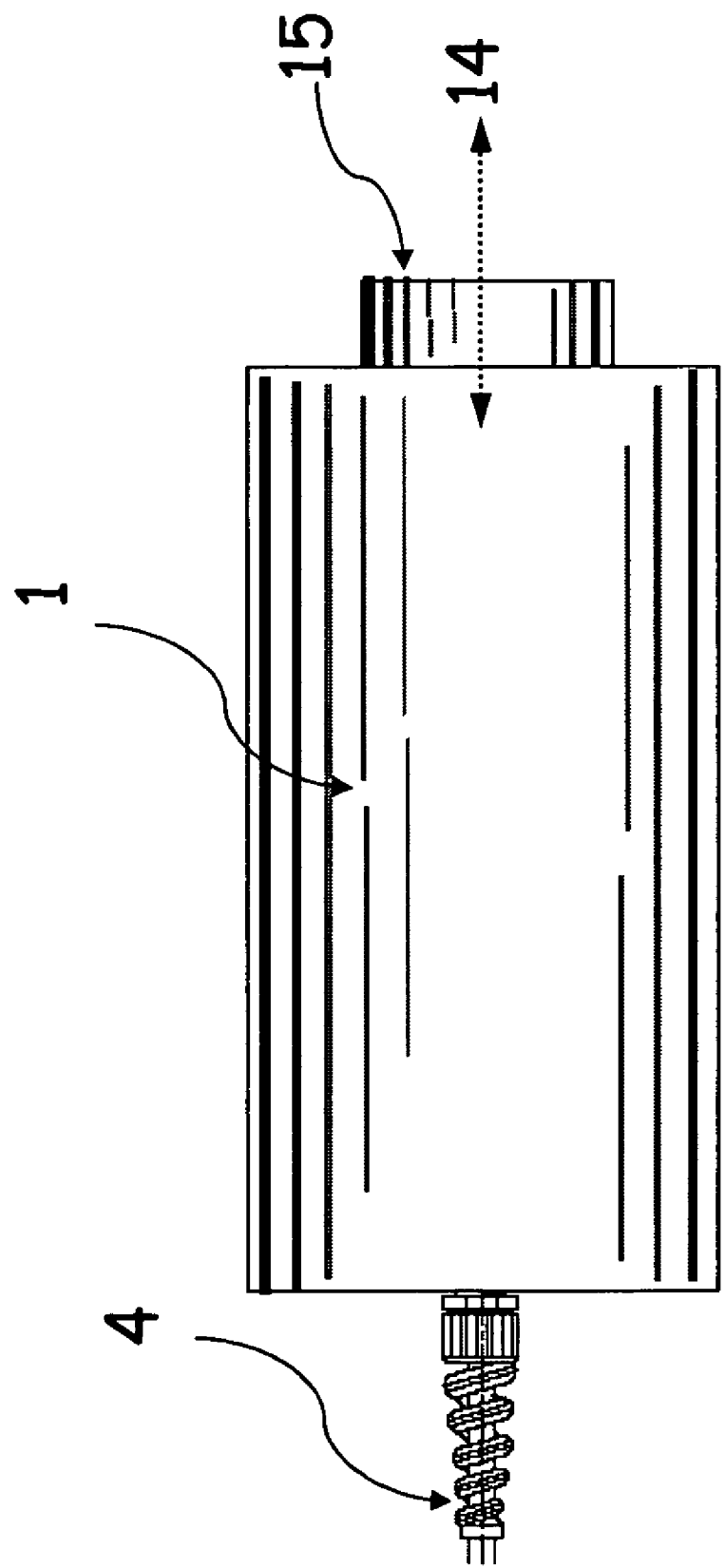
FIG. 3—Vibrating Debris Remover converter sub-unit.
Figure 4:
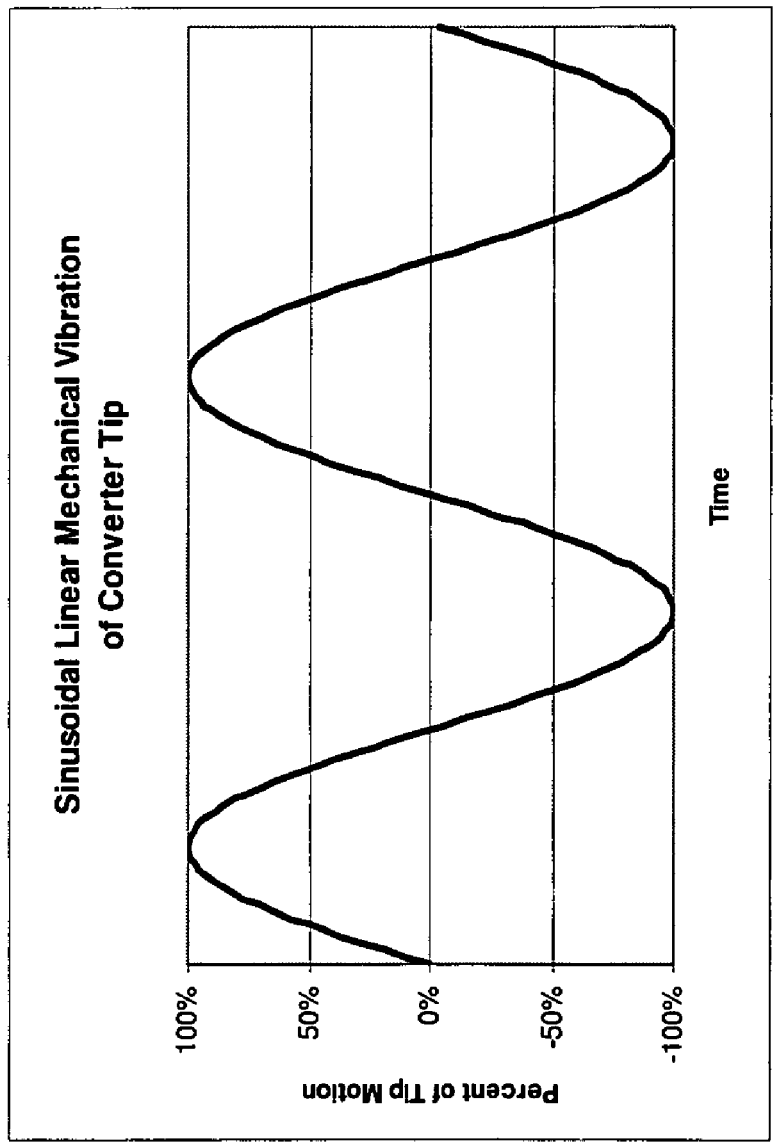
FIG. 4—Sinusoidal vibration motion at the converter sub-unit tip.
Figure 5:
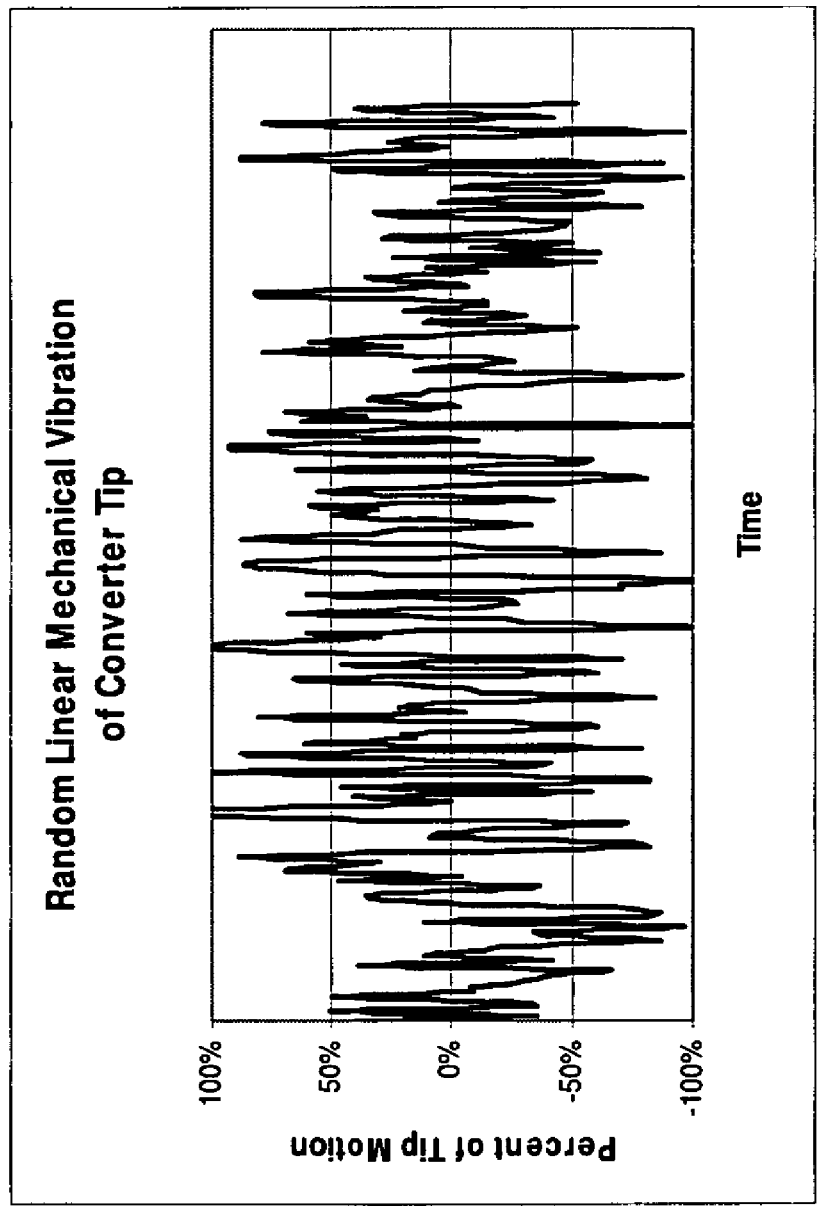
FIG. 5—Random vibration motion at the converter sub-unit tip.
Figure 6:
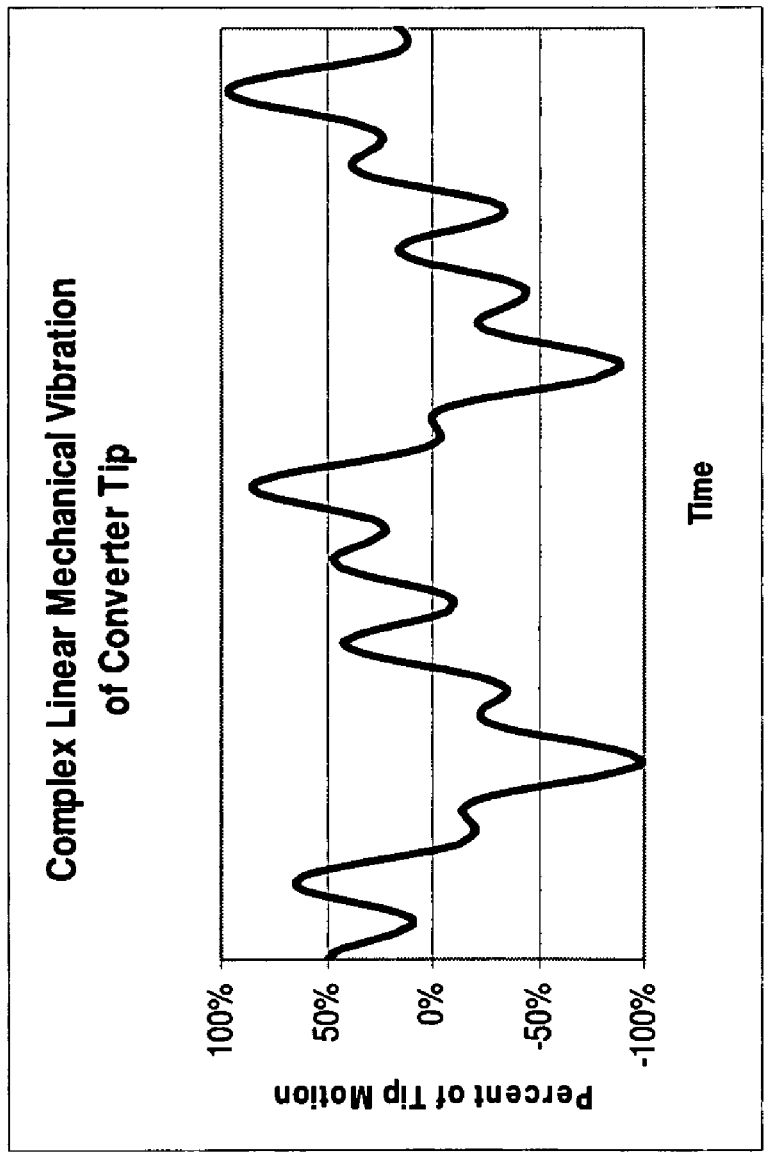
FIG. 6—Complex vibration motion at the converter sub-unit tip.

Converter Sub-Unit: As shown in FIG. 1 and in FIG. 3, the converter sub-unit 1 has the purpose of converting an external energy source 4 such as electrical, pneumatic, or fluid into longitudinal mechanical motion 14 of the converter sub-unit tip surface 15. The longitudinal mechanical motion 14 of the converter sub-unit tip surface 15 could take the form of a sine wave FIG. 4, random wave FIG. 5, complex wave FIG. 6, or a pulse wave FIG. 7. In addition, the longitudinal mechanical motion 14 of the converter sub-unit tip surface 15 could be a combination of all or some of the above mentioned waveforms.

Figure 8:
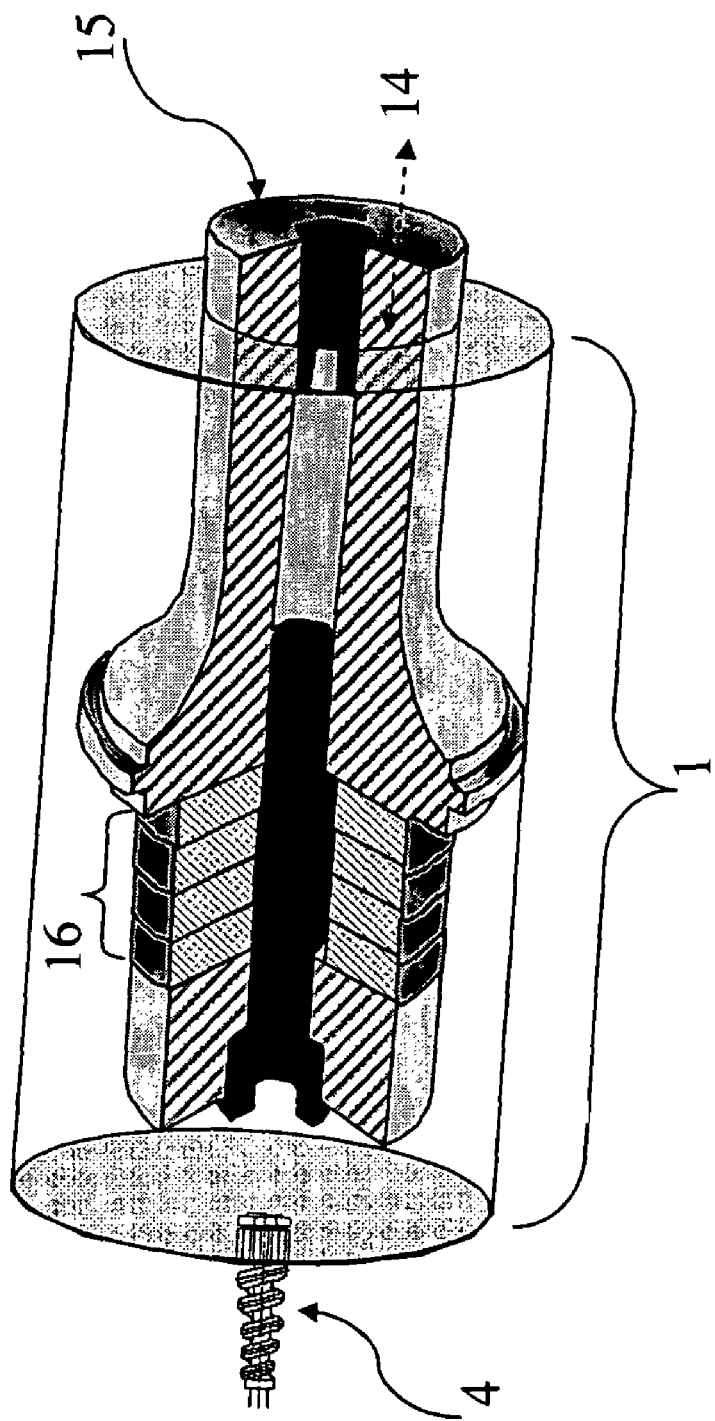
FIG. 8—Vibrating Debris Remover piezoelectric converter sub-unit.

There are several devices in existence which can perform the function of the converter 1. As an example, electrical energy source 4 can be converted into longitudinal mechanical vibration motion 14 of the converter sub-unit tip surface 15 through the use of a piezoelectric transducer consisting of piezoelectric material 16 as shown in FIG. 8. An example of such a device is described in U.S. Pat. No. 6,570,295. Electrical energy 4 can also be converted into longitudinal mechanical vibration motion 14 of the converter sub-unit tip surface 15 through the use of a magnetostrictive transducer as described in U.S. Pat. No. 6,624,539.

An electrical energy source 4 can also be converted into longitudinal mechanical vibration motion 14 of the converter sub-unit tip surface 15 is through the use of an electric motor and gearing as described in U.S. Pat. No. 4,231,155.

As a further example, a pneumatic energy source 4 can be converted into longitudinal mechanical vibration motion 14 of the converter sub-unit tip surface 15 through the use of a pneumatic hammer as described in U.S. Pat. No. 5,930,899.

As a final example, longitudinal mechanical vibration motion 14 of the converter sub-unit tip surface 15 can be created through the use of whistles and sirens which use a fluid jet energy source 4, such as compressed air, to pass through some sort of orifice causing the support structure to vibrate as described in U.S. Pat. No. 4,609,368.

As an example of a device that can create a longitudinal mechanical shock pulse motion, the device described in U.S. Pat. No. 4,349,143 uses an electrically activated solenoid to cause the movement of a plunger component. This plunger component can be a metal rod such that when it contacts another surface a shock pulse is created which travels into the contacting surface.

Figure 9:
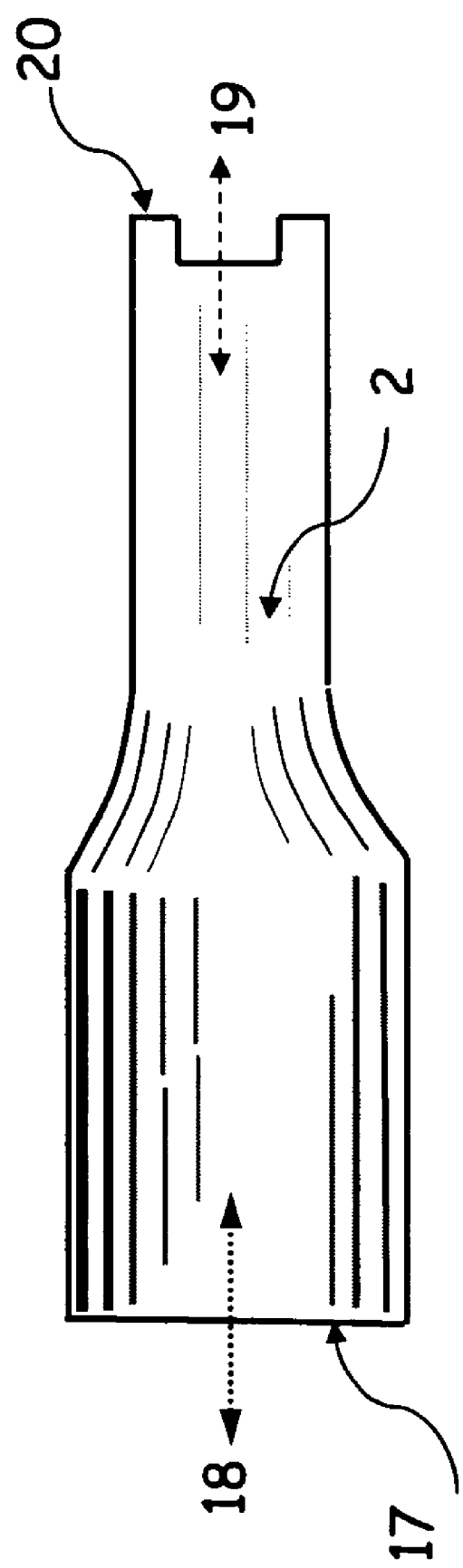
FIG. 9—Coupler sub-unit with stepped geometry.

Converter Sub-Unit to Coupler Sub-Unit Attachment: The converter sub-unit tip surface 15 is in contact with the coupler sub-unit surface 17 shown in FIG. 9. These two surfaces are connected to each other in such a fashion to ensure that the longitudinal mechanical vibration and/or shock pulse motion 14 from the converter sub-unit tip surface 15 transfers into the coupler sub-unit surface 17. This causes the coupler sub-unit surface 17 to have longitudinal vibration motion 18 which transfers through the coupler sub-unit 2 and creates longitudinal mechanical vibration and/or shock pulse motion 19 at the coupler sub-unit tip surface 20.

Figure 10:
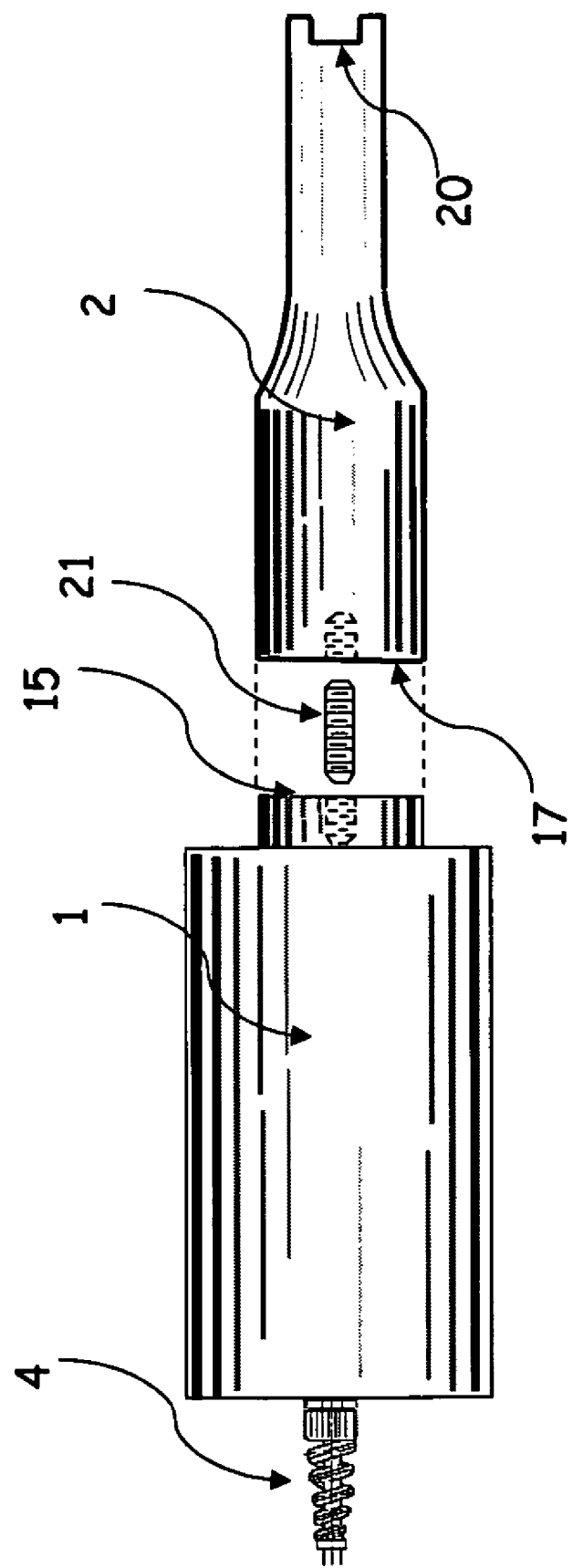
FIG. 10—Converter sub-unit connected to coupler sub-unit via a stud fastener.

For example, as shown in FIG. 10, the connection could be made with an inserted stud 21. Attachment of the converter sub-unit 1 and the coupler sub-unit 2 onto the stud 21 is made such that the converter sub-unit tip surface 15 and the coupler sub-unit surface 17 are placed and remain in compression. This configuration results in a design which the converter sub-unit 1 can be removed and replaced relatively easy.

Figure 11:
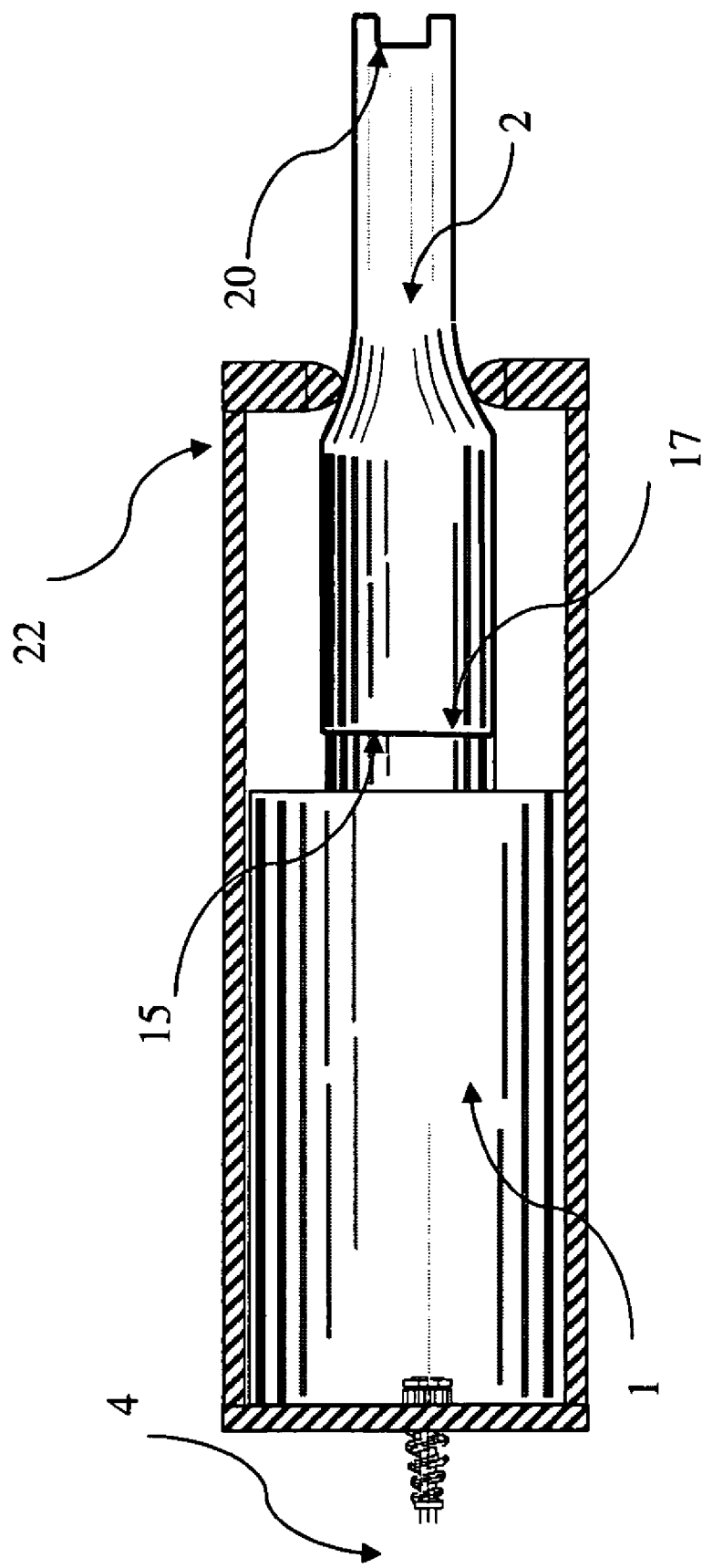
FIG. 11—Converter sub-unit connected to coupler sub-unit via a support frame.

As an additional example, as shown in FIG. 11, the converter sub-unit tip surface 15 and the coupler sub-unit surface 17 could be placed in compression by pushing the converter sub-unit tip surface 15 up against the coupling sub-unit surface 17 through the use of some sort of clamping device 22 such that the converter sub-unit tip surface 15 and the coupler sub-unit surface 17 are placed and remain in compression. This configuration results in a design which the converter sub-unit 1 can be removed and replaced.

Figure 12:
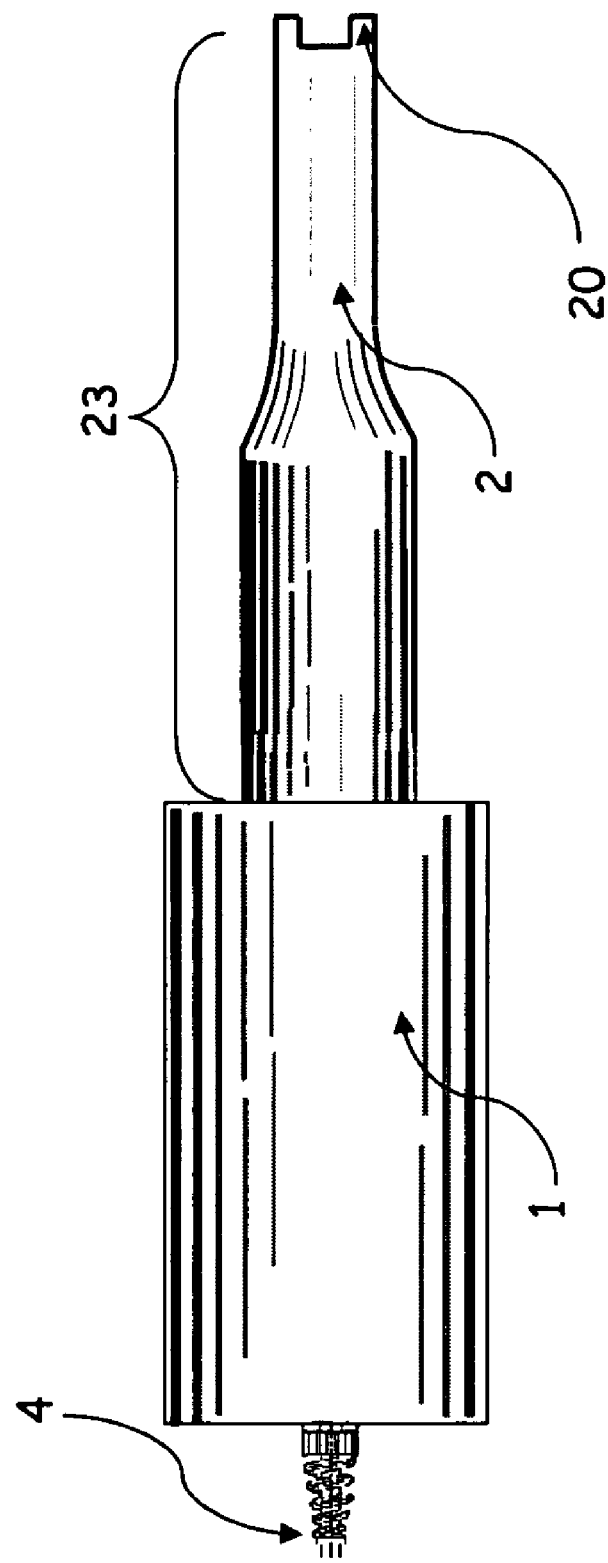
FIG. 12—Converter sub-unit and coupler sub-unit made from same material.

Or as shown in FIG. 12, the converter sub-unit tip surface 15 and coupling sub-unit surface 17 could be made nonexistent because the converter sub-unit 1 and the coupler sub-unit 2 are made from a single piece of material 23. In this arrangement, the converter sub-unit 1 would not be removable from the coupler sub-unit 2. This configuration results in a design that would create a difficult maintenance situation if the converter sub-unit 1 had to be replaced.

In any case, one of the key design criteria of the vibrating debris remover 6 is to ensure a good compressive interface exists between the converter sub-unit tip surface 15 and the coupling sub-unit surface 17. The most efficient design would ensure that the converter sub-unit tip surface 15 and the coupling sub-unit surface 17 always remain in compression.

Converter Sub-Unit to Coupler Sub-Unit Material Matching: In addition to ensuring a good compressive interface exists between the converter tip surface 15 and coupling sub-unit surface 17, it is also advantageous to understand what impedance values exists between the materials used for the converter sub-unit 1 and the coupler sub-unit 2. By understanding the material impedances, the values of the stress wave reflection and stress wave transmission coefficients can be calculated at the interface of the converter sub-unit tip surface 15 to coupler sub-unit surface 17. The longitudinal mechanical vibration and/or shock pulse motion 14 of the converter sub-unit tip surface 15 is transferred by a force from the converter sub-unit tip surface 15 pushing up against the coupler sub-unit surface 17. Since this force is acting through the cross sectional area of the converter sub-unit tip surface 15, a stress state is present at this interface.

This stress state is important to know because there are cases in which the longitudinal mechanical vibration and/or shock pulse motion 14 of the converter tip 15 does not create any substantial longitudinal mechanical vibration and/or shock pulse motion 18 at the converter surface 17. This condition exists if there is a significant difference between the impedance values of the converter sub-unit 1 and coupler sub-unit 2 materials. The result is a very inefficient design and the amount of energy 4 required for the converter sub-unit 1 to remove debris 5 on the material surface 3 would be unreasonably high.

Figure 13:
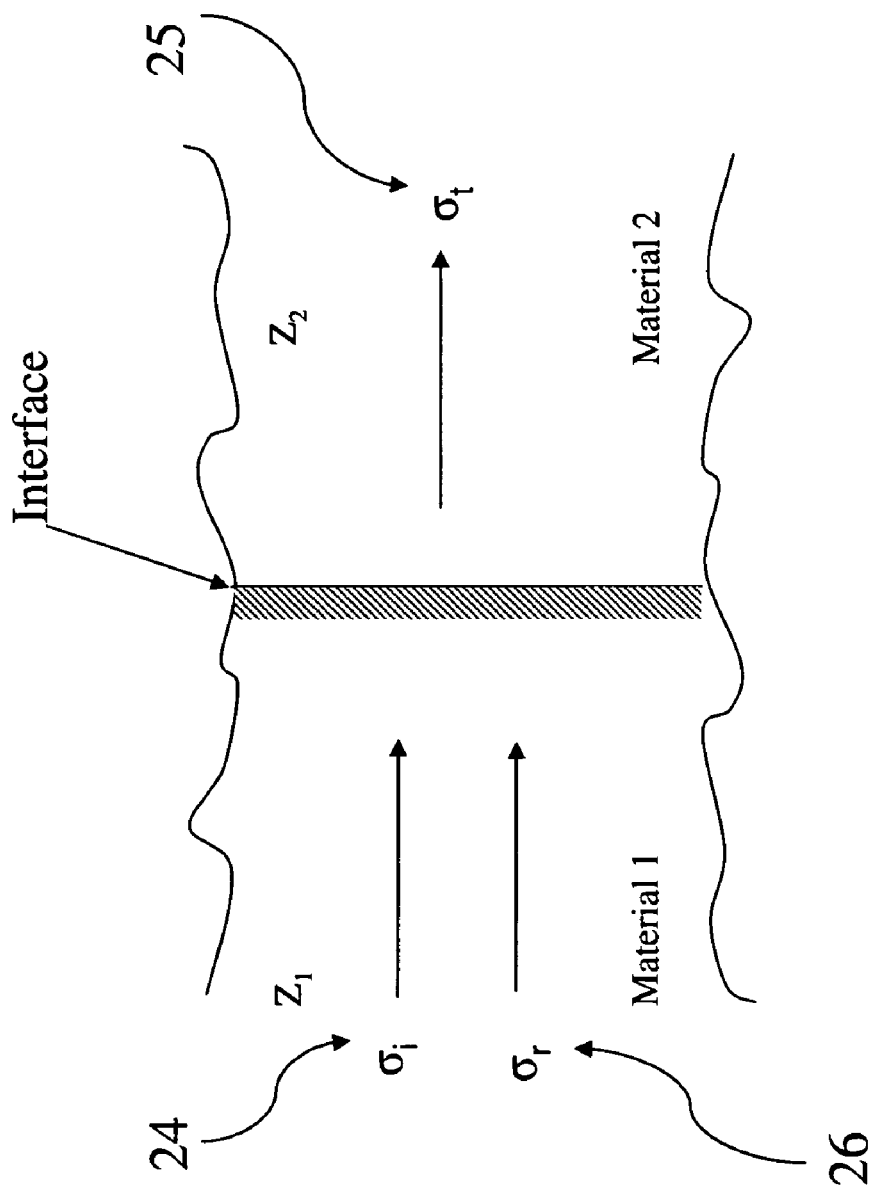
FIG. 13—Stress transmission definition across an interface.

Referring to FIG. 13 and assuming that the converter sub-unit tip surface 15 and the coupler sub-unit surface 17 have identical cross sectional areas, mathematical equations (1) and (2) can be used to determine the stress transmission and stress reflection coefficients at this interface.

$$r = \frac{Z_2 - Z_1}{Z_2 + Z_1} \qquad \text{Equation (1)}$$

$$t = \frac{2Z_2}{Z_2 + Z_1} \qquad \text{Equation (2)}$$

Where:
  r=the stress reflection coefficient
  t=the stress transmission coefficient
  $Z_1$=impedance of material 1
  $Z_2$=impedance of material 2

Using Equations (1) and (2), it can be shown that if the material properties of the converter sub-unit and coupler sub-unit are the same, then $Z_1=Z_2$ and the stress reflection coefficient is zero and the stress transmission coefficient is one. This means that the incident stress wave 24 is completely transmitted with no reflected stress wave 26. The incident stress wave 24 and the transmitted stress wave 25 have the same magnitudes.

However, if $Z_1 > Z_2$, it can be shown using Equations (1) and (2) that the magnitude of the transmitted stress wave 25 will have less magnitude than the original incident stress wave 24. In addition, the reflected stress wave 26 will have a negative value. This means that an incident stress wave 24 that is compressive 10 in nature will be reflected 26 as a rarefaction 11 and that an incident stress wave 24 that is a rarefaction 11 in nature will be reflected 26 as a compressive 10 wave.

Also notice that if $Z_1 < Z_2$, it can be shown using Equations (1) and (2) that the stress reflection coefficient is greater than a value of zero and the stress transmission coefficient is greater than a value of one. This means that the incident stress wave 24 is amplified through the joint and that the transmitted stress wave 25 has a higher magnitude than the incident stress wave 24.

By choosing the proper materials for the converter sub-unit 1 and coupler sub-unit 2, an efficient transfer of stress 25 can be achieved at the converter sub-unit tip surface 15 to coupler sub-unit surface 17.

Figure 14:
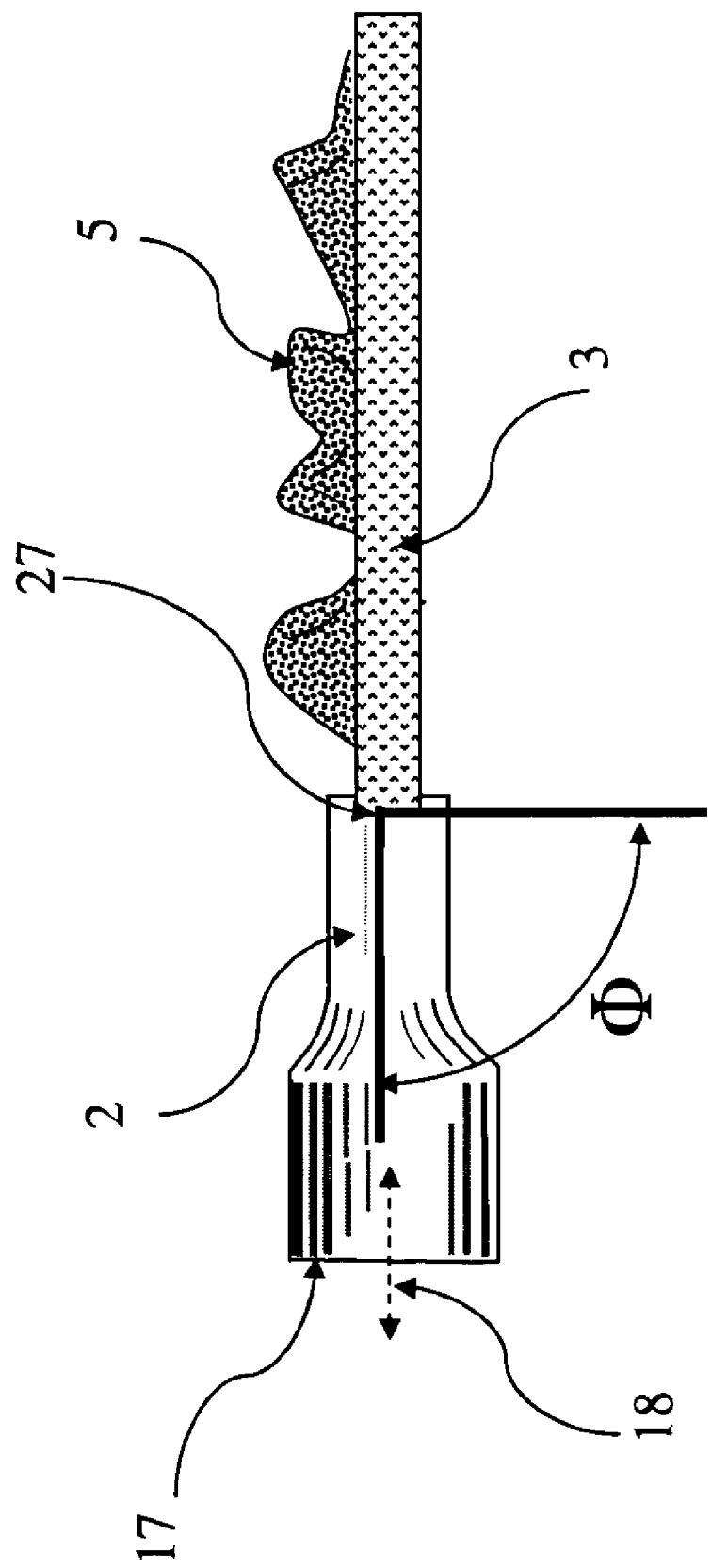
FIG. 14—Coupler unit to material connection definitions.

Coupler Sub-unit: The coupler sub-unit 2 has the purpose of transmitting the converter sub-unit's 1 longitudinal mechanical vibration and/or shock pulse motion 14 into the edge 27 of the material 3. There are several advantages to using a coupler sub-unit 2. These advantages are: (I) the converter sub-unit 1 can be easily removed for repairs and also easily installed, (II) the coupler sub-unit 2 can serve as an impedance buffer to better match the converter sub-unit 1 material and the material 3, (III) the coupler sub-unit 2 can be designed to reduce, magnify, or keep constant the amplitude of the converter sub-unit's 1 mechanical motion 14 before it enters the material 3, (IV) it can direct the longitudinal mechanical vibration and/or shock pulse motion developed by the converter sub-unit 1 in a direction which is not the same as the longitudinal mechanical vibration and/or shock pulse motion direction in the material 3, and (V) the coupler sub-unit 2 can be specially designed to attached to the material 3 edge 27 as shown in FIG. 14.

As an example to explain how the coupler sub-unit 2 can be designed to serve as an impedance buffer, or how it can be designed to reduce, magnify, or keep constant the amplitude of the converter sub-unit's 1 mechanical motion 14 before it enters the material 3, mathematical Equations (3) and (4) can be used.

Figure 15:
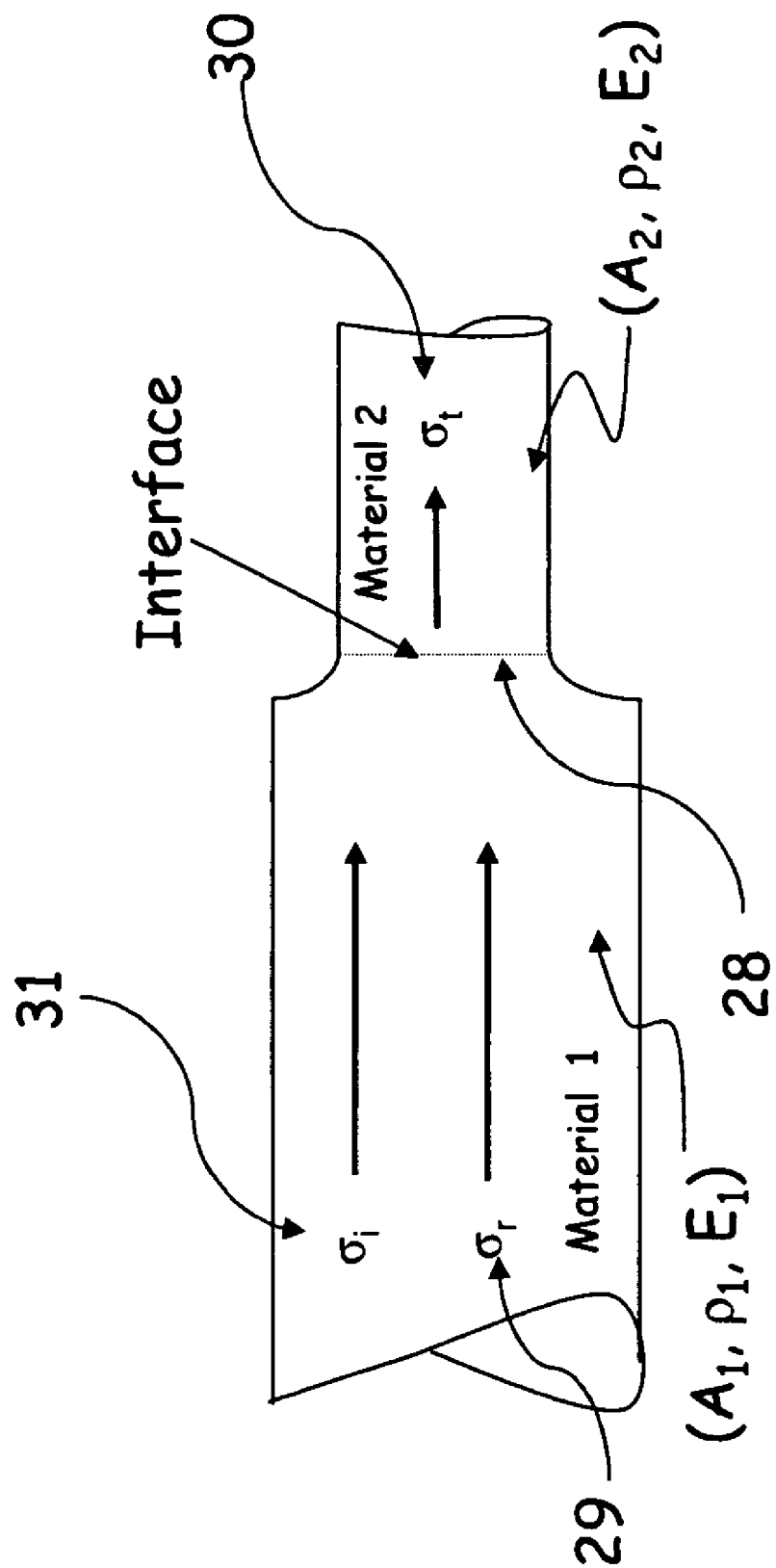
FIG. 15—Coupler sub-unit with stepped geometry stress transmission definition.

Referring to FIG. 15 and Equations (3) and (4) the knowledge of how stress will transfer through an interface 28 of two different materials and a step in cross sectional areas is presented. FIG. 15 represents a side view of a coupler sub-unit 2 that utilizes a step change in height along its length.

These equations take into account driving point impedances, differences of material properties, and cross sectional areas to determine the relationship between the incident, reflected, and transmitted stress waves.

These equations are:

$$\sigma_t = \frac{2\left(\frac{Z*_2}{Z*_1}\right)\left(\frac{A_1}{A_2}\right)}{1+\left(\frac{Z*_2}{Z*_1}\right)}\sigma_i \quad \text{Equation (3)}$$

$$\sigma_r = \frac{\left(\frac{Z*_2}{Z*_1}\right)-1}{1+\left(\frac{Z*_2}{Z*_1}\right)}\sigma_i \quad \text{Equation (4)}$$

Where:
- $\sigma_i$=the incident stress (traveling in material 1 toward material 2)
- $\sigma_r$=the stress reflection back into material 1
- $\sigma_t$=the stress transmitted into material 2
- $Z*_1$=driving point impedance of material 1
- $Z*_2$=driving point impedance of material 2
- $A_1$=cross sectional area of material 1
- $A_2$=cross sectional area of material 2

And since force balance at the interface 28 must be maintained, the following force balance relationship must be achieved:

$$A_1(\sigma_i)=A_2(\sigma_t)-A_1(\sigma_r) \quad \text{Equation (5)}$$

Figure 16:
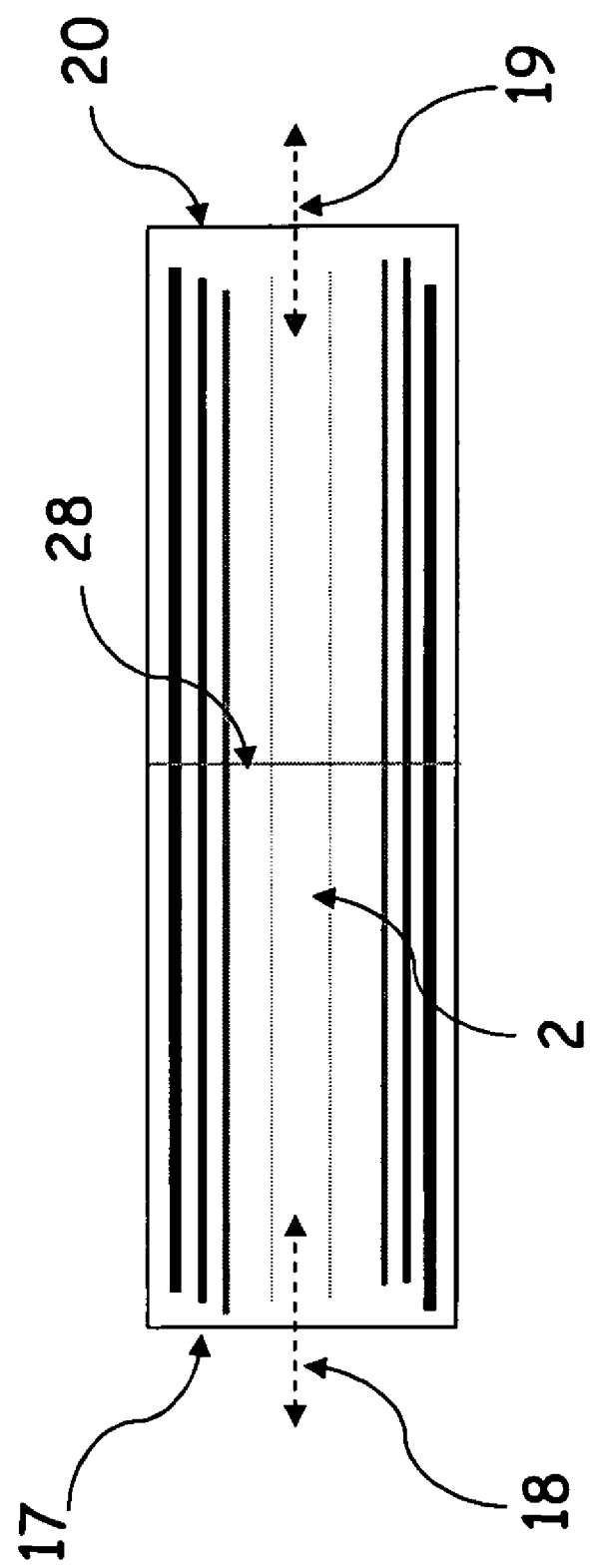
FIG. 16—Coupler sub-unit with no stepped geometry.

Example Coupler Sub-unit of a Single Material and No Step Change in Area: Since in this case the coupler sub-unit 2 is made of a single material, $Z*_1=Z*_2$. Referring to FIGS. 15 and 16 and using Equations (3) and (4), it is shown that as long as there is no cross sectional area changes in the coupler sub-unit 2, there will be no reflected stress wave 29. Also, the transmitted stress wave magnitude 30 is equal to the incident stress wave 31. Thus the longitudinal mechanical vibration and/or shock pulse motion 18 at the coupler sub-unit surface 17 and the longitudinal mechanical vibration and/or shock pulse motion 19 present at the coupler sub-unit tip surface 20 will have the same magnitude. Using Equation (5), force balance across the interface 28 is maintained.

In reality there will be some damping losses in the coupler sub-unit 2 which will cause the longitudinal mechanical vibration and/or shock pulse motion 19 at the coupler sub-unit tip 20 to be lower in magnitude than the longitudinal mechanical vibration and/or shock pulse motion 18 at the coupler sub-unit surface 17. However, the material damping loss factors can be minimized.

Figure 17:
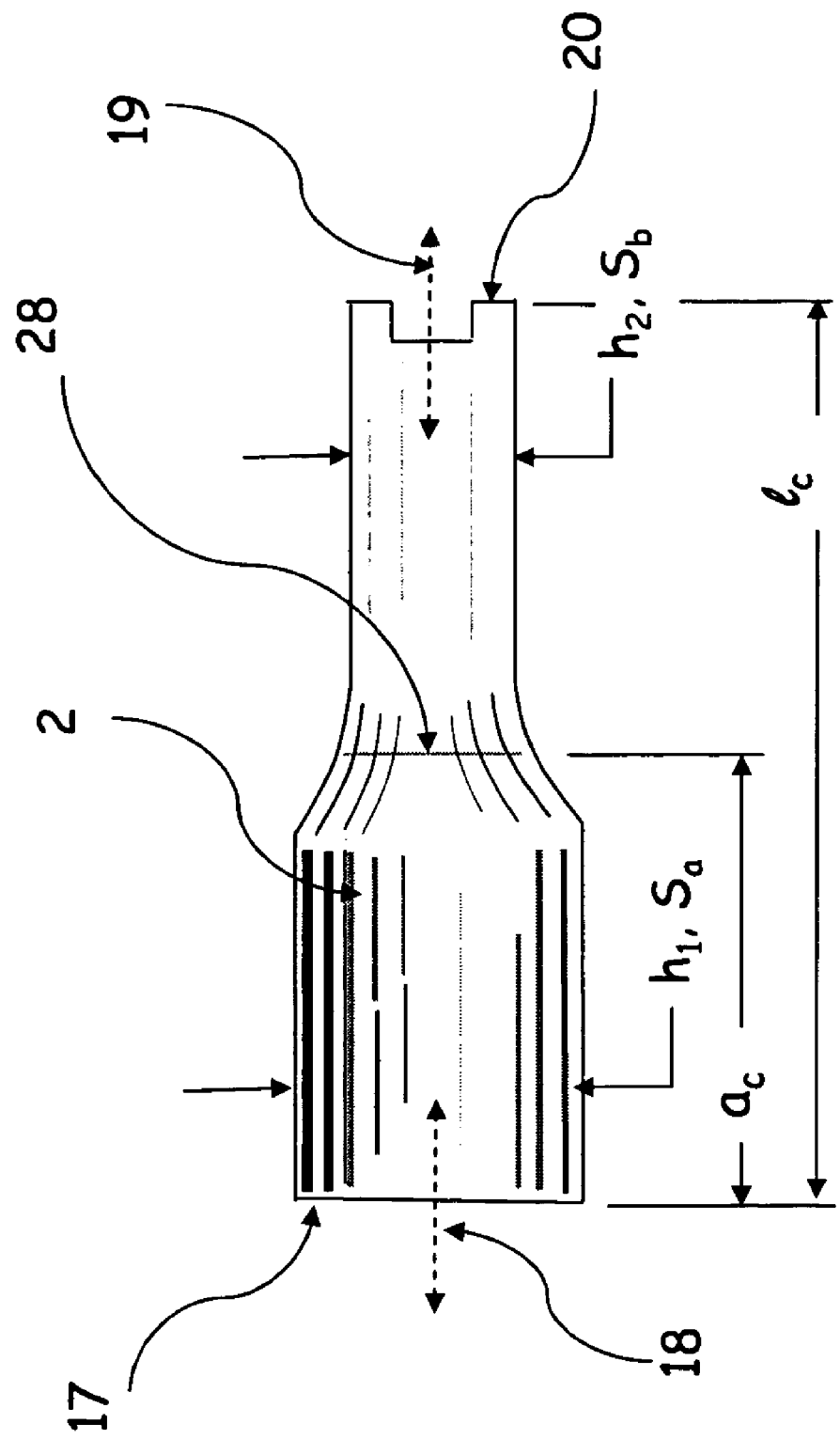
FIG. 17—Coupler sub-unit with stepped geometry; area $A_1$>area $A_2$.

Example Coupler Sub-Unit of a Single Material with a Step Change in Area: Since in this case the coupler sub-unit 2 is made of a single material, $Z*_1=Z*_2$. Referring to FIGS. 15 and 17 and using Equations (3) and (4), it is shown that if the coupler sub-unit 2 has a cross sectional area change in which $A_1$ is larger than $A_2$, the coupler sub-unit will have a reflected stress wave 29 that has a magnitude which is less than the incident stress wave 31 and will have the opposite sign of the incident wave. This opposite sign means that an incident compressive stress wave is reflected as a rarefaction (tension) stress wave and an incident rarefaction stress wave is reflected as compression stress wave. The transmitted stress wave 30 will be greater in magnitude than the incident stress wave 31. As a check, the force balance of Equation (5) is maintained.

Figure 18:
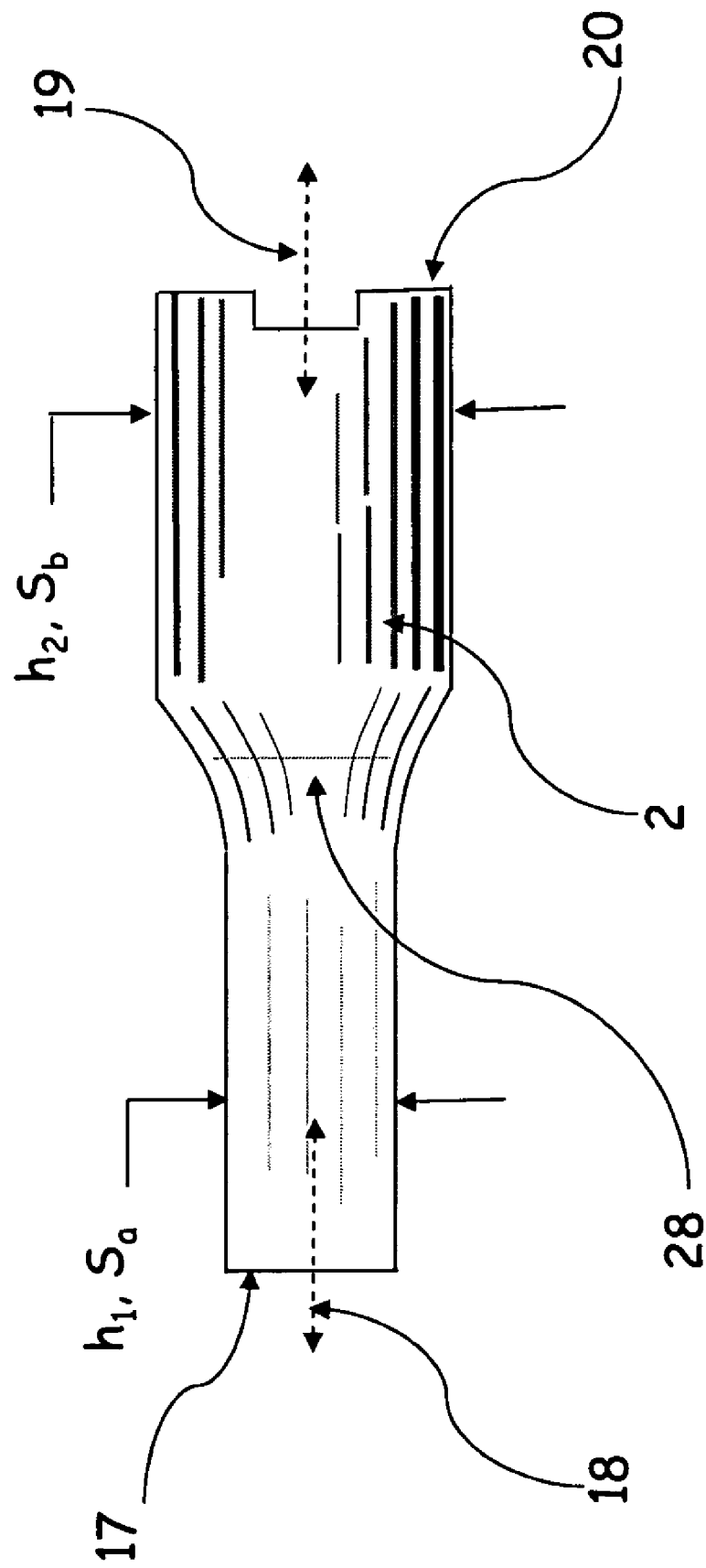
FIG. 18—Coupler sub-unit with stepped geometry; area $A_1$<area $A_2$.

Referring to FIGS. 15 and 18 and using Equations (3) and (4), it is shown that if the coupler sub-unit 2 has a cross sectional area change in which $A_1$ is smaller than $A_2$, the coupler sub-unit will have a reflected stress wave 29 that has a magnitude which is less than the incident stress wave 31 and will have the same sign of the incident wave. This same sign means that an incident compressive stress wave is reflected as a compressive stress wave and an incident rarefaction (tension) stress wave is reflected as rarefaction stress wave. The transmitted stress wave 30 will be smaller in magnitude than the incident stress wave 31. As a check, the force balance of Equation (5) is maintained.

As can be seen from Equations (3) and (4), there are a great many combinations of materials and area ratios that could be used in designing the stepped coupler sub-unit 2. However, it can be stated that if the stepped coupler sub-unit 2 is made of a single material and there is a step change in height along the coupler sub-unit such that $A_1>A_2$, then the magnitude of the longitudinal mechanical vibration and/or shock pulse motion 19 of the coupler sub-unit tip surface 20 will be greater than the longitudinal mechanical vibration and/or shock pulse motion 18 of the coupler sub-unit surface 17 based only on these parameters.

Figure 19:
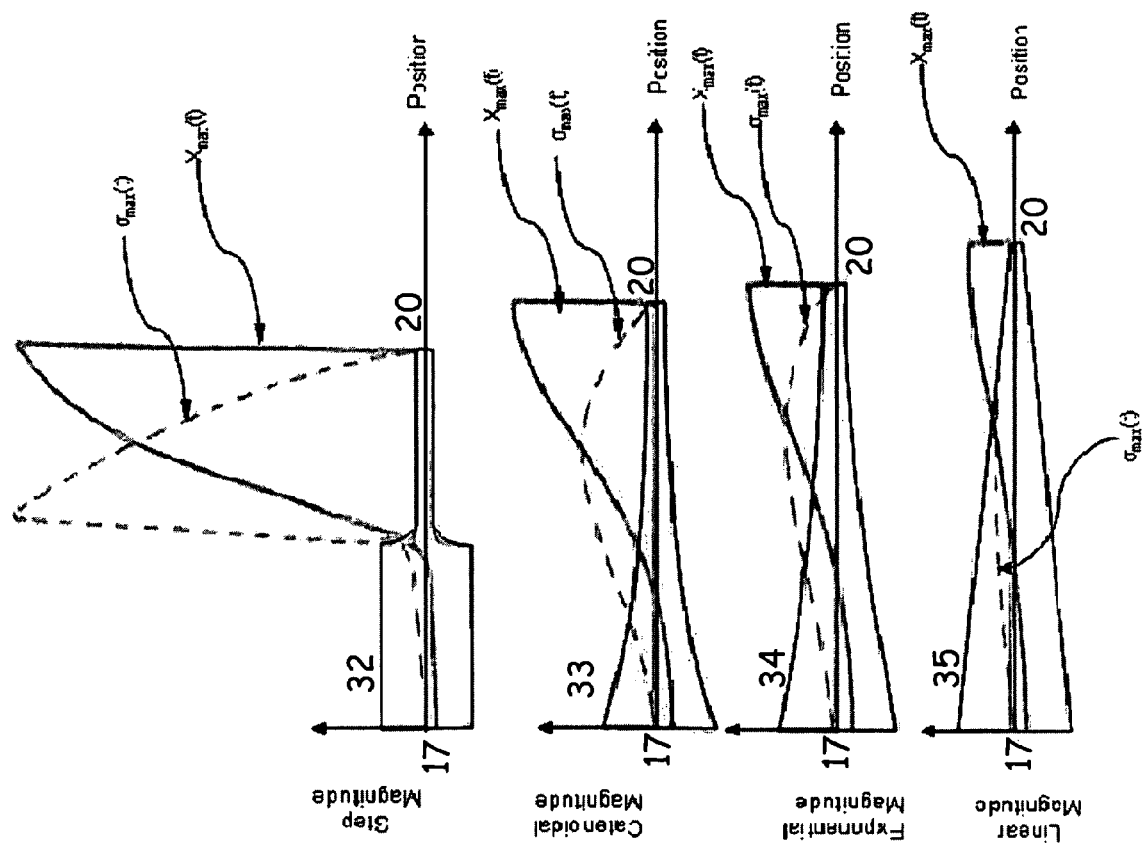
FIG. 19—Examples of coupler unit geometries.
Figure 20:
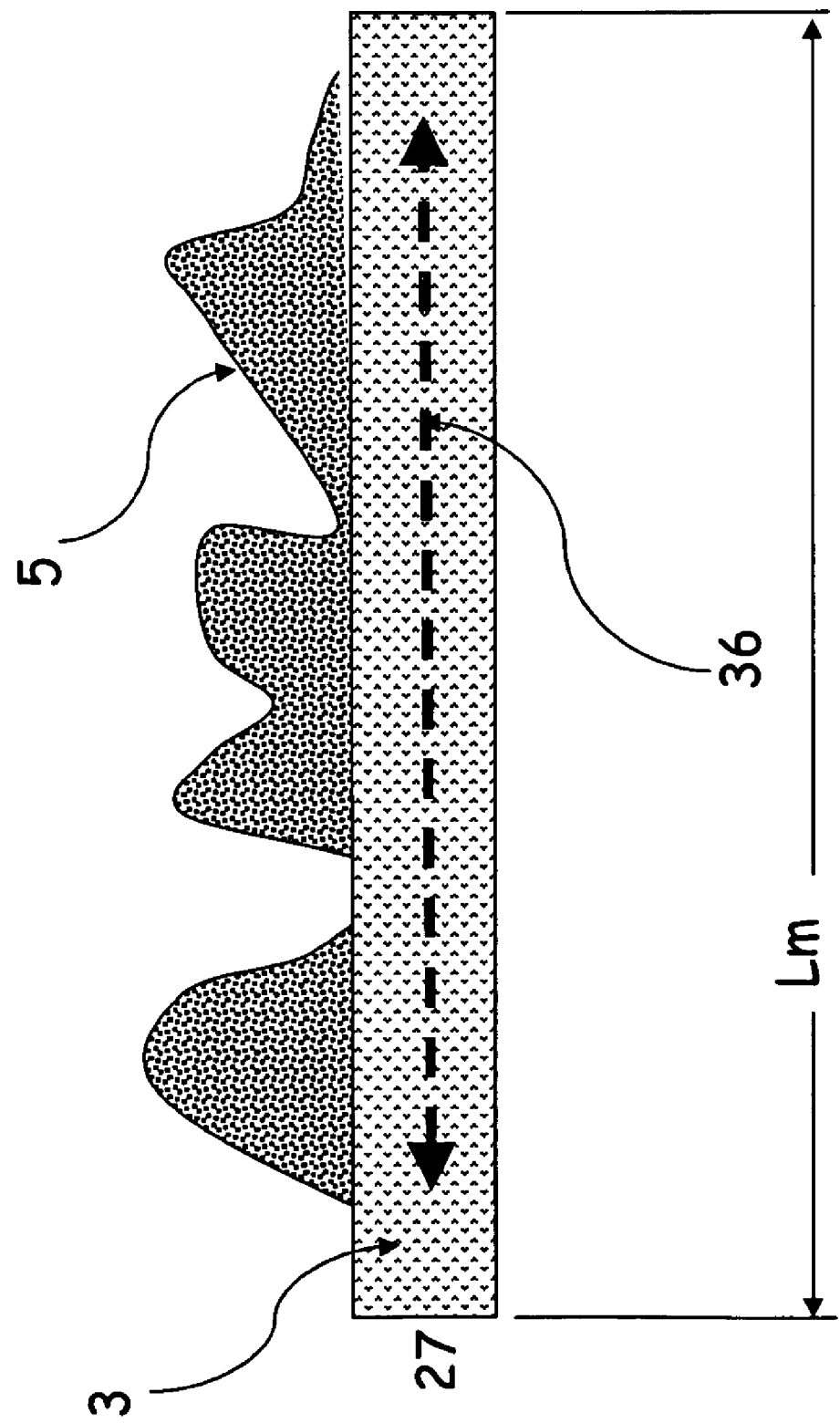
FIG. 20—Material on which debris is attached.

Other types of Coupler Sub-Unit Geometries: There are other coupler sub-unit 2 designs that do not utilize a step change in area along the coupler sub-unit 2 length to amplify the longitudinal mechanical vibration and/or shock pulse motion 18 of the coupler sub-unit surface 17. These designs still have a change in height between the coupler sub-unit surface 17 and the coupler sub-unit tip surface 20 but utilize other geometries to achieve this. As examples of these other geometries, FIG. 19 shows the side views of coupler sub-units 2 that have the following geometries: step 32, catenoidal 33, exponential 34, and longitudinal taper 35. FIG. 19 also shows how the displacements and internal material stresses change throughout the length of the coupler sub-unit 2.

There are many choices for the coupler sub-unit geometries. Several engineering text books are available that go into great detail as to how to calculate engineering parameters such as displacement and internal material stress of coupler sub-units 2 that have various geometric properties.

Coupler Sub-Unit to Material Surface Attachment: The coupler sub-unit tip surface 20 is in contact with the edge 27 of the material 3. These two surfaces are connected to each other in such a fashion as to ensure that the longitudinal mechanical vibration and/or shock pulse motion 19 from the coupler sub-unit tip surface 20 transfers into the material 3 of interest causing the material to vibrate 36 with a longitudinal 7, transverse 8, or both a longitudinal and transverse motion 9.

The coupler sub-unit 2 can be connected to the material 3 at some angle, Φ, as shown in FIG. 14. If the coupler sub-unit is attached parallel, Φ=0°, to the material surface, then a longitudinal wave 7 will be present in the material 3. If the coupler sub-unit 2 is connected to the material 3 such that 0°<Φ<90°, then a longitudinal and transverse wave 9 will be present in the material 3. If the coupler is attached perpendicular, Φ=90°, to the surface, then a transverse wave 8 will be present in the material 3. In any attachment configuration, consideration must be given to ensure that the vibration 36 resulting in the material is sufficient to break the adhesive bond between the debris 5 and the material 3 surface.

Figure 21:
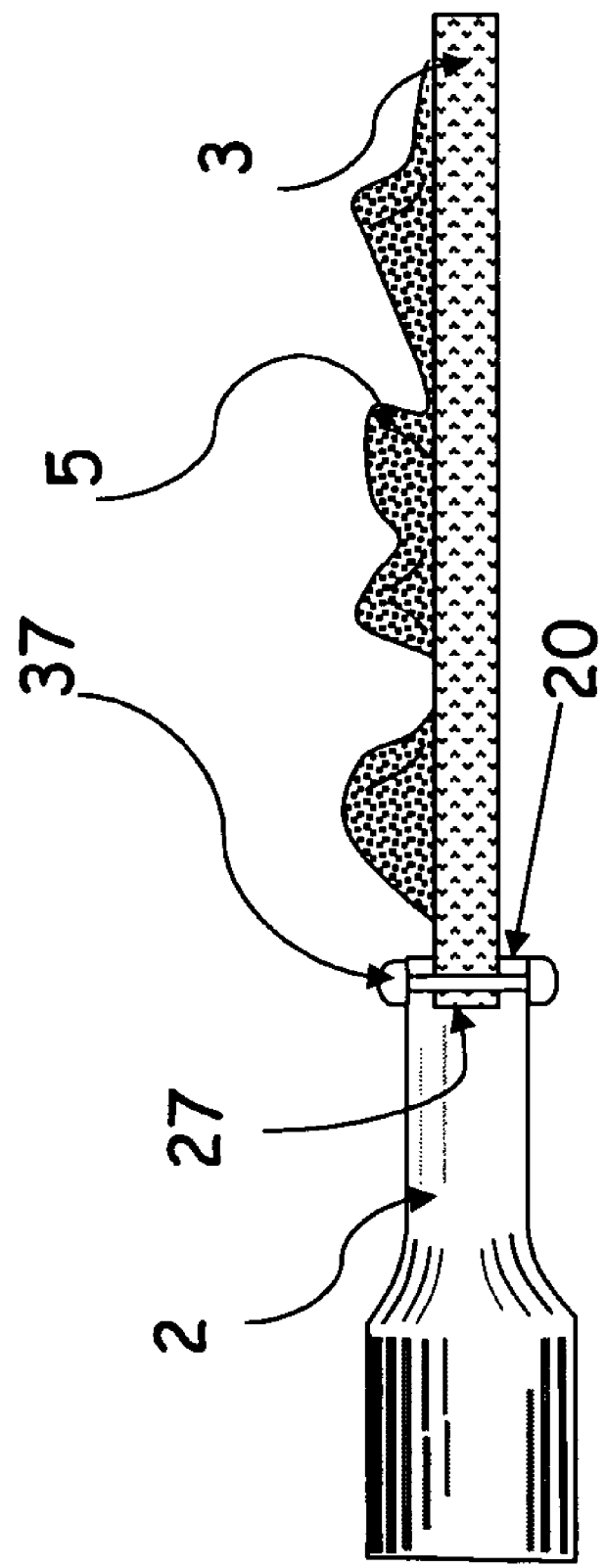
FIG. 21—Coupler sub-unit connected to material via a fastener.

For example, as shown in FIG. 21, the connection could be made with an inserted fastener 37 and attaching the coupler sub-unit 2 and the material 3 together such that the coupler sub-unit tip surface 20 is and the material edge 27 are placed and remain in compression.

Figure 22:
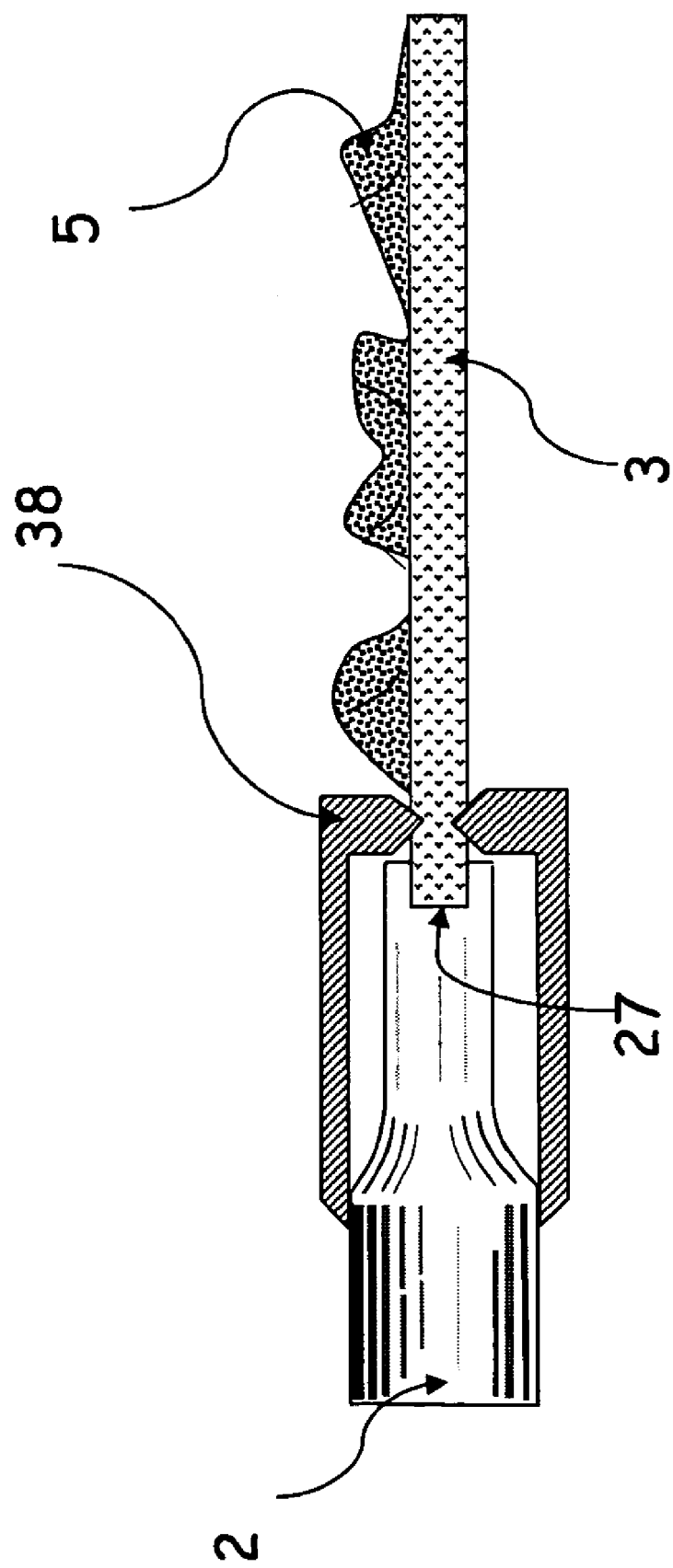
FIG. 22—Coupler sub-unit connected to material via a support frame.

Additionally, as shown in FIG. 22, the coupler sub-unit tip surface 20 and the material edge 27 could be placed and remain compression by pushing the coupler sub-unit tip surface 20 up against the material edge 27 through the use of some sort of clamping device 38 such that the coupler sub-unit tip surface 20 and the material edge 27 are placed and remain in compression.

Figure 23:
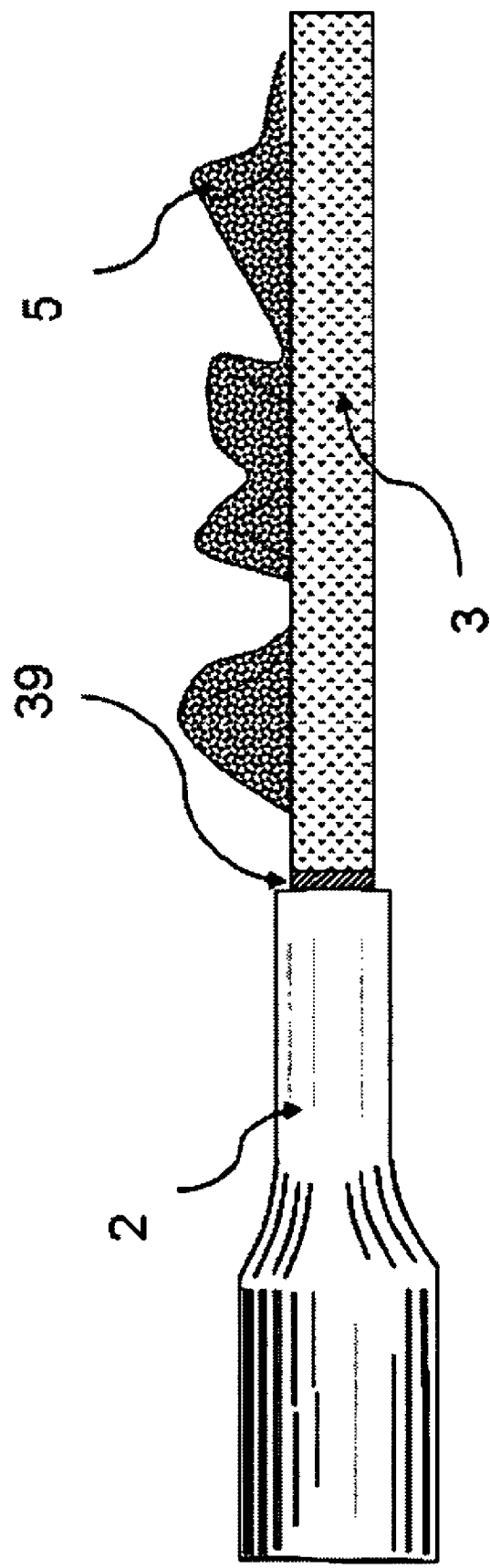
FIG. 23—Coupler sub-unit connected to material via an adhesive bond.

Or as shown in FIG. 23, the coupler sub-unit tip surface 20 and material edge 27 could be glued together with some form of adhesive 39. During the adhesive process, the coupler sub-unit tip surface 20 and the material edge 27 would be placed in compression with each other and held in place until the adhesive 39 cured. After the adhesive 39 cured, the two surfaces would be held in place by the adhesive 39 with longitudinal mechanical vibration and/or shock pulse motion transferring from the coupler sub-unit 2 into the material 3 through the adhesive. This similar process could be used to attach the converter sub-unit surface 15 to the coupler unit surface 17.

Figure 24:
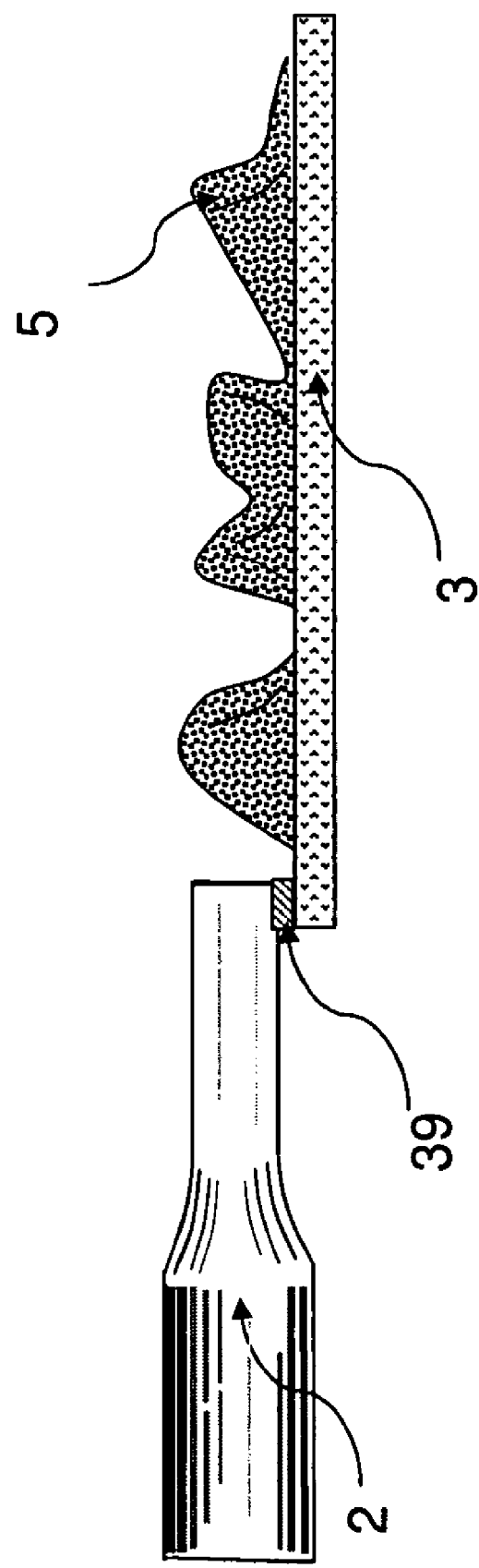
FIG. 24—Coupler sub-unit with offset connection to material via an adhesive bond.

Or as shown in FIG. 24, the coupler sub-unit 2 and material 3 could be glued together with some form of adhesive 39 along the side surfaces. During the adhesive process, the coupler sub-unit 2 and the material 3 would be placed in compression with each other and held in place until the adhesive 39 cured. After the adhesive 39 cured, the two surfaces would be held in place by the adhesive 39 with longitudinal mechanical vibration and/or shock pulse motion transferring from the coupler sub-unit 2 into the material 3 through the adhesive.

Figure 25:
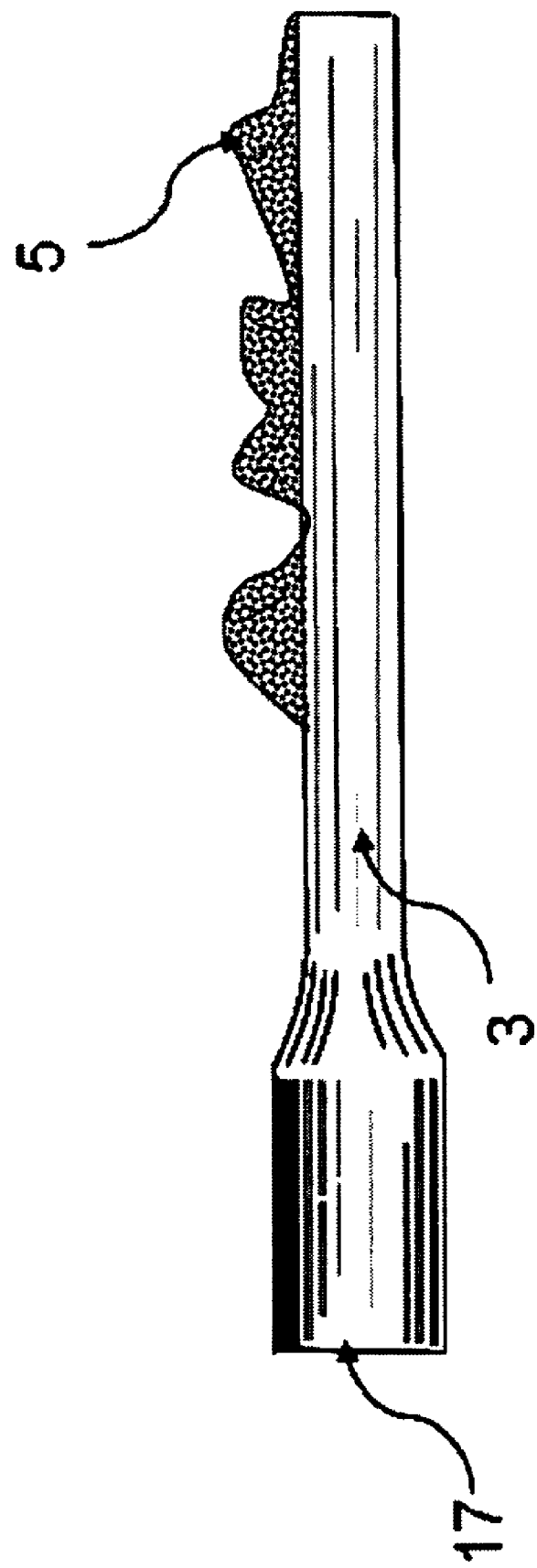
FIG. 25—Coupler sub-unit and material made into one sub-unit.

As a final example shown in FIG. 25, the coupler sub-unit tip surface 20 and material edge 27 could be made nonexistent because the coupler sub-unit 2 and the material 3 are made from a single piece of material 3.

In any case, one of the key design criteria is to ensure a good attachment exists between the coupler sub-unit tip surface 20, which is experiencing longitudinal mechanical vibration and/or shock pulse motion 19, and the material edge 27. The most efficient design would ensure that the coupler sub-unit tip surface 20 and the material edge 27 always remain in compression or have a strong adhesive 39 joint between them.

Figure 26:
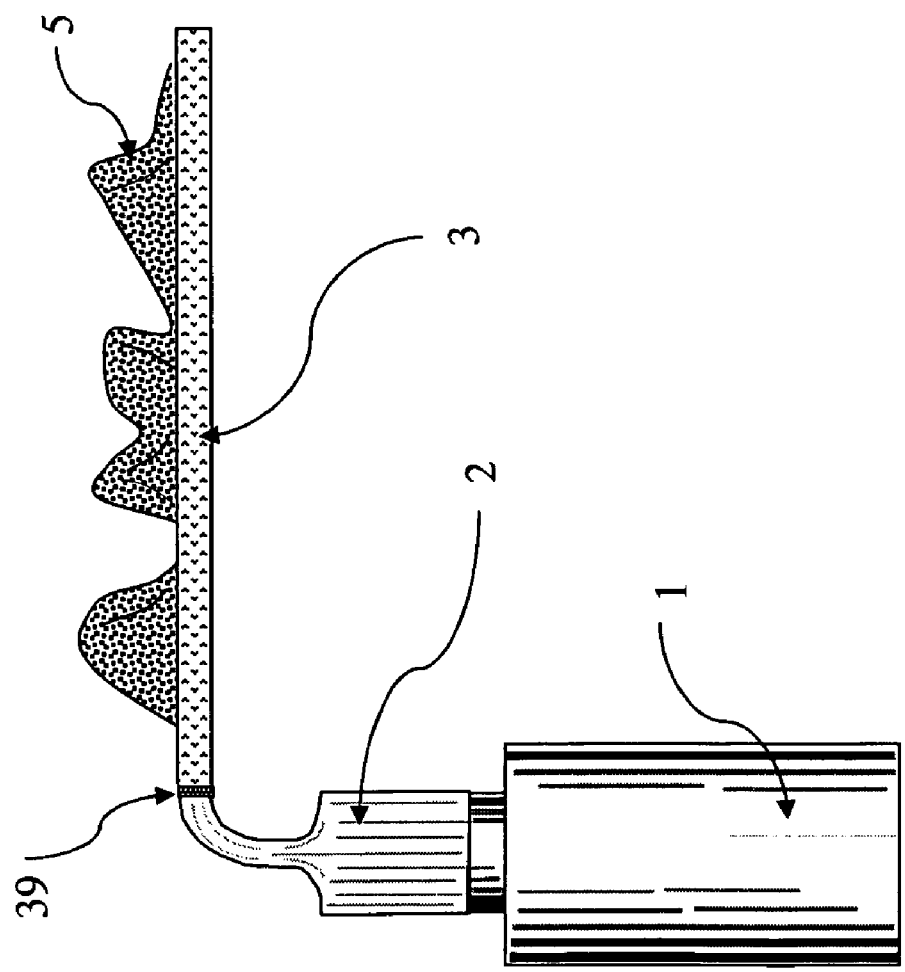
FIG. 26—Coupler sub-unit redirecting mechanical motion from converter sub-unit.

An additional feature of the coupler sub-unit 2, as shown in FIG. 26, is that it can be designed to direct the longitudinal mechanical vibration and/or shock pulse motion developed by the converter sub-unit 1 in a direction and/or plane of reference which is not the same as the longitudinal mechanical vibration and/or shock pulse motion in the material 3.

Coupler Sub-Unit to Material Surface Material Matching: In addition to ensuring a good compressive or adhesive attachment between the coupler sub-unit tip surface 20 and the material edge 27, it is also advantageous to understand what impedance values exists between the materials used for the coupler sub-unit 2 and the material 3. By understanding the material impedances, the values of the stress wave reflection and stress wave transmission coefficients can be calculated at the interface of the coupler sub-unit tip surface 20 to material edge 27. The longitudinal vibration motion 19 of the coupler sub-unit tip surface 20 is transferred by a force from the coupler sub-unit tip surface 20 pushing up against the material edge 27. Since this force is acting through the cross sectional area of the coupler sub-unit tip surface 20, a stress state is present at this interface. An efficient matching process of the materials and area changes between the coupler sub-unit 2 and material 3 are similar as was described in section 3.0.

Figure 27:
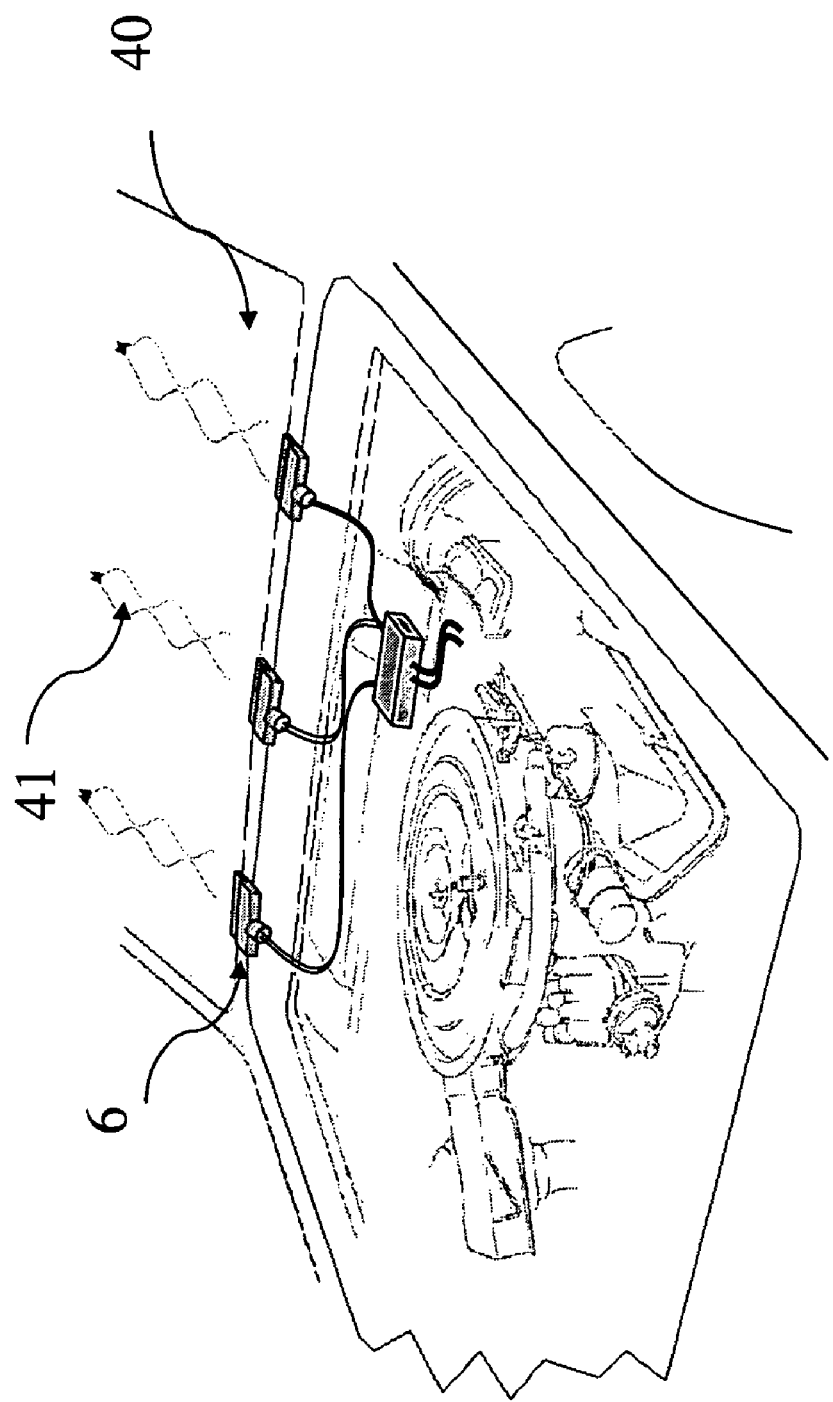
FIG. 27—Example of vibrating debris remover applied to an automobile windshield.
Figure 28:
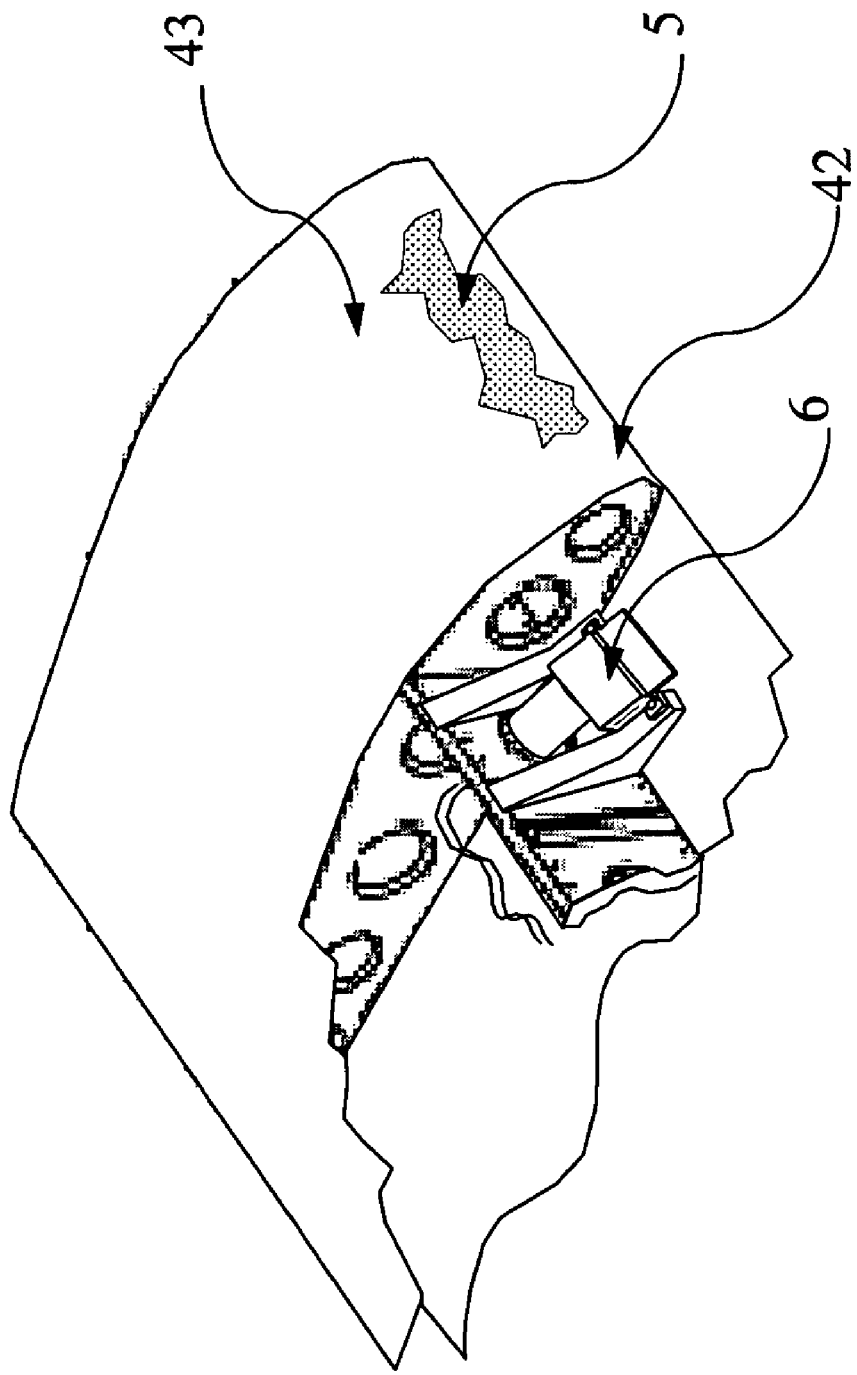
FIG. 28—Example of vibrating debris remover applied to an aircraft wing.

Material with Debris Attached: The material 3 of interest has the debris 5 that is to be removed. For example, and as shown in FIG. 27, this material surface may serve the purpose of the windshield of an automobile 40. It may also be the leading edge 42 of an aircraft wing 43 as shown in FIG. 28. In any case, the existence of debris 5, such as ice and water, on the material 3 surface is not desired and is to be removed.

Designing an Efficient Vibrating System: In order that sufficient relative acceleration, strain, and strain rate can be achieved at the interface between the debris 5 and material 3 surface, an efficient design must be developed. The most efficient design for the vibrating debris remover 6 not only has to deal with the impedance matching of the converter sub-unit 1 to the coupler sub-unit 2 and the coupler sub-unit 2 to the material 3 of interest, but it also must be designed to vibrate with the least amount of energy 4 as possible while achieving the highest accelerations and strain rates in the material 3 and debris 5. This condition is known as resonance. Once the resonance state is achieved, the particle motions in the coupler sub-unit 2 and the material 3 of interest can have much greater amplitudes than the motions present in the material particles of the converter sub-unit 1. If low material damping is present, high Q or amplification values can be achieved. The result of high Q values is particle motion 36 and accelerations in the material 3 of interest which will cause the adhesive bond with the debris 5 particle to be broken.

To achieve resonance, the frequency of vibration of the converter sub-unit 1, coupler sub-unit 2, and the material 3 surface of interest must be the same (or within very close tolerance). The operating frequency of the converter sub-unit 1 and the coupler sub-unit 2 must be based on the frequency of a waveform traveling in the material 3

Once the vibration frequency of the waveform in the material 3 has been determined, it is advantageous to determine the physical dimensions for the coupler sub-unit 2 such that it also wants to vibrate at the same frequency in addition to designing the converter sub-unit 1 to operate at this same frequency.

If proper impedance matching is performed between all materials and the vibrating debris remover 6 is designed to vibrate with a sinusoidal motion at the same frequency as the material 3, then an energy efficient system will be developed.

Designing an Efficient Shock Pulse System: In order that sufficient relative acceleration, strain, and strain rate can be achieved at the interface between the debris 5 and material 3 surface, an efficient design must be developed. The most efficient design for the shock pulse debris remover 6 not only has to deal with the impedance matching of the converter sub-unit 1 to the coupler sub-unit 2 and the coupler sub-unit 2 to the material 3 of interest, but the coupler sub-unit must be designed to vibrate at the same frequency as the material of interest.

The frequency of vibration of the coupler sub-unit 2 and the material 3 of interest must be the same (or within very close tolerance). The operating frequency of the coupler sub-unit 2 must be based on the frequency of a waveform traveling in the material 3. Once the vibration frequency of the waveform in the material 3 has been determined, it is advantageous to determine the physical dimensions for the coupler sub-unit 2 such that it also wants to vibrate at the same frequency. For a vibrating debris remover 6 designed to produce a shock pulse or multiple shock pulses, only the coupler sub-unit 2 has to be designed to vibrate at the same frequency as the material 3 for an energy efficient system to be developed.

Figure 29:
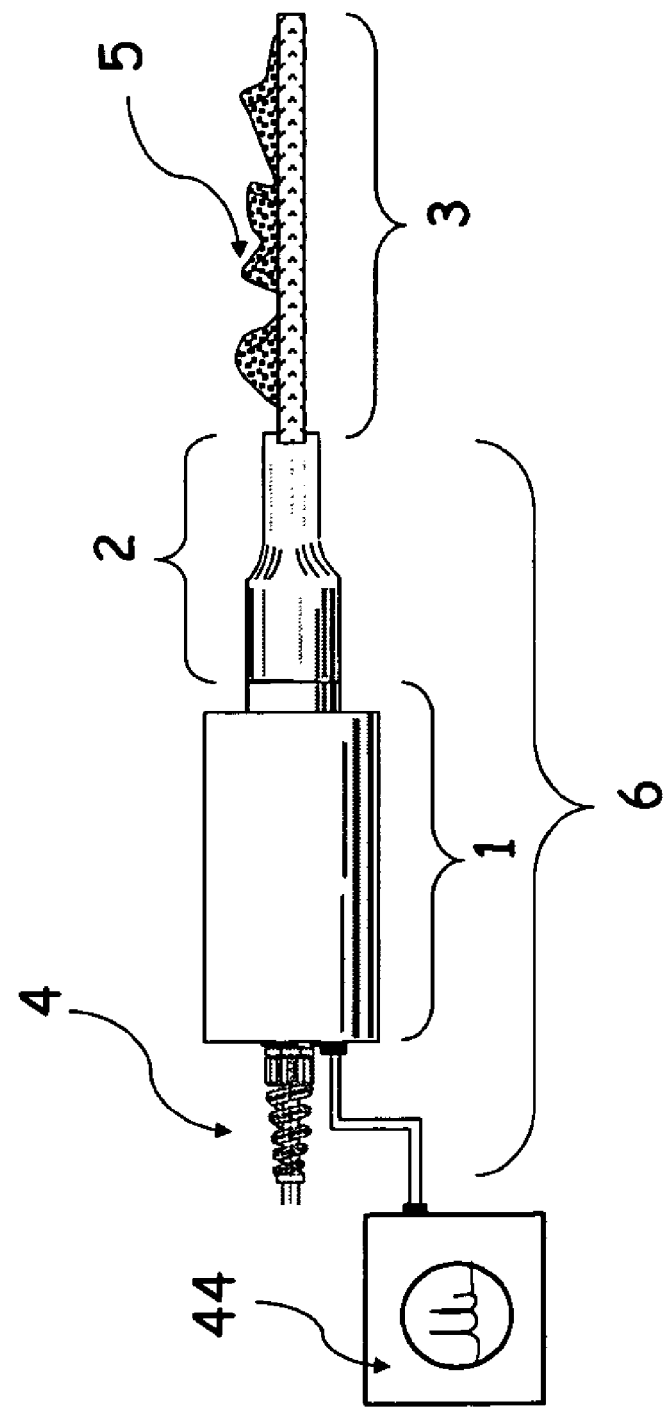
FIG. 29—Vibrating Debris Remover with a pulser/receiver and/or frequency spectrum analyzer attached to the converter sub-unit.
Figure 30:
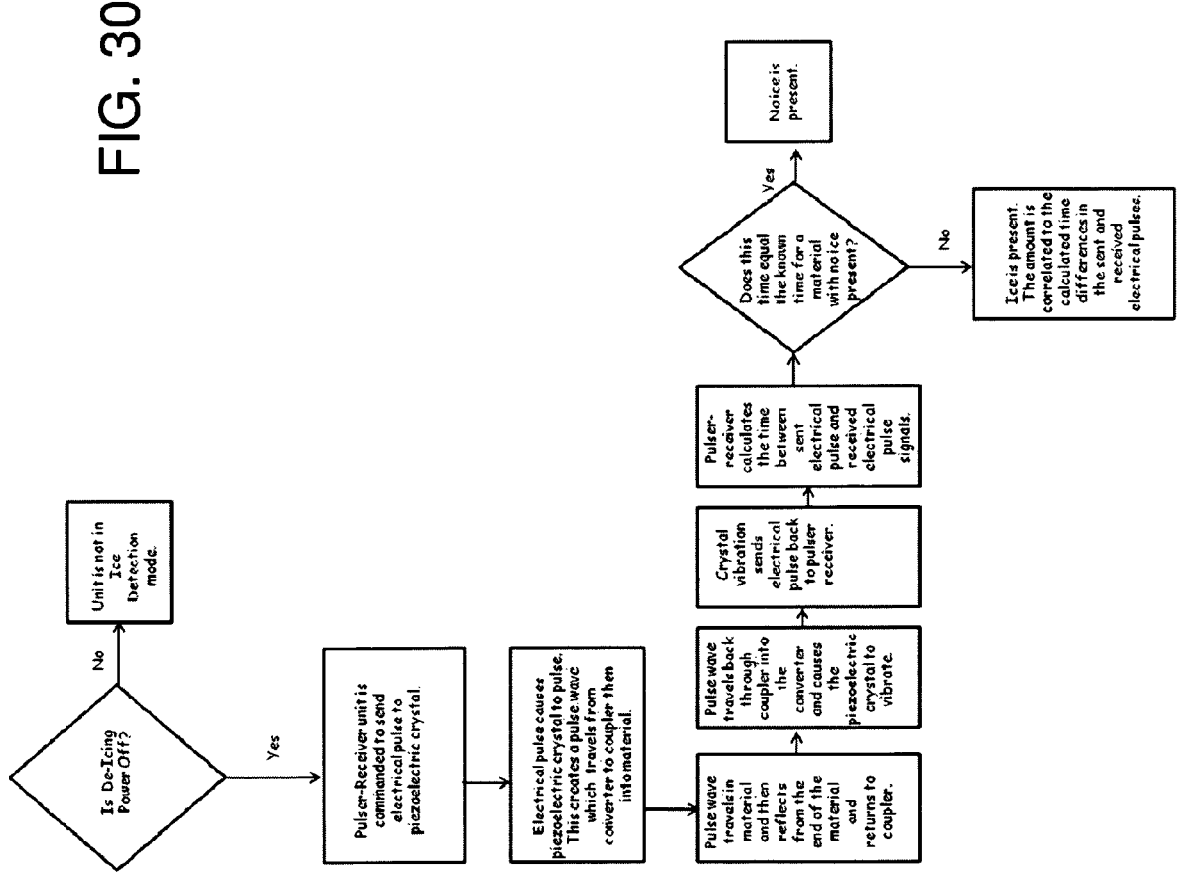
FIG. 30—Flow chart describing how the Vibrating Debris Remover with a pulser/receiver electronic unit attached to it would be used as a debris detector.
Figure 31:
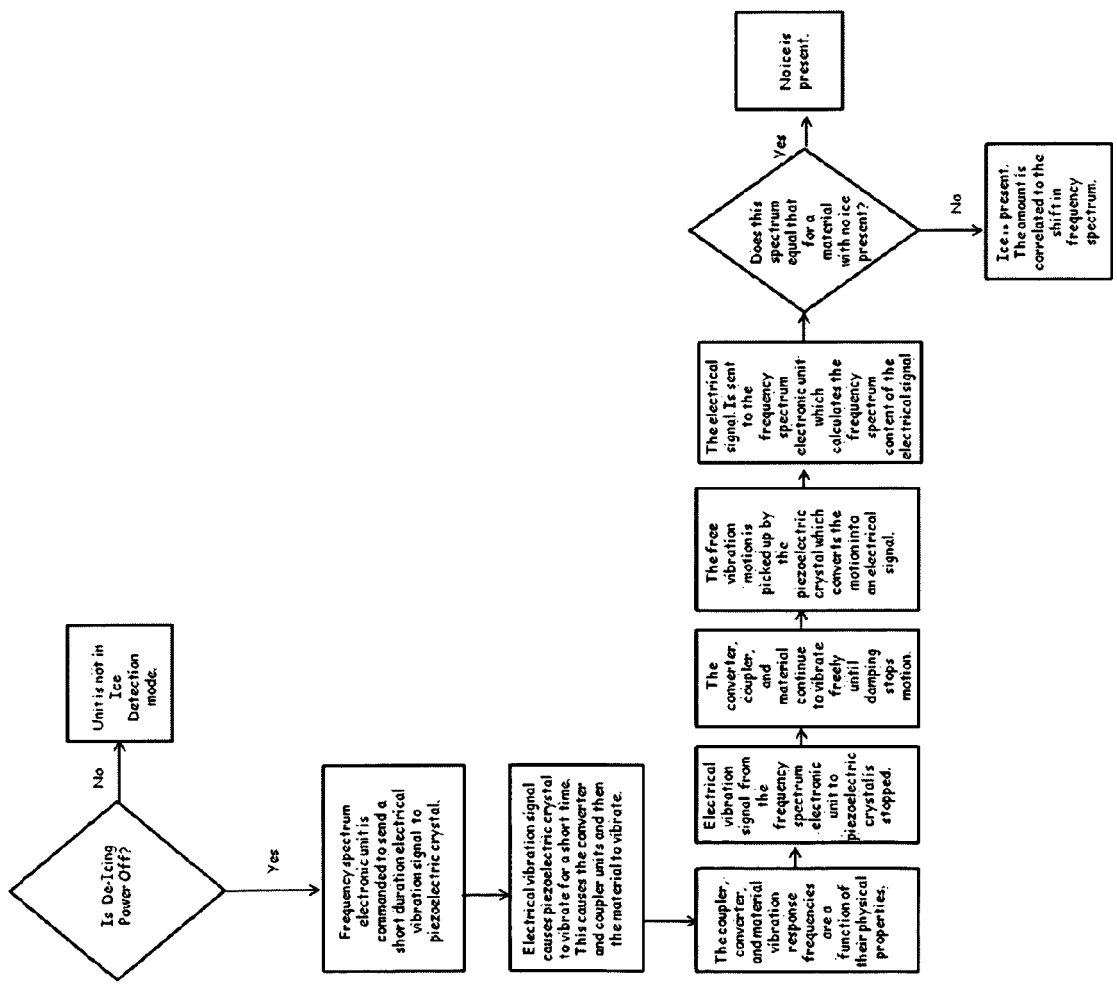
FIG. 31—Flow chart describing how the Vibrating Debris Remover with a frequency spectrum analyzer electronic unit attached to it would be used as a debris detector.

Using the Converter Unit as a Debris Detector: If the converter sub-unit 1 utilizes a piezoelectric crystal 16 to convert electrical energy 4 into mechanical motion 14, it could also be attached to a pulser/receiver and/or a frequency spectrum electronic unit 44 to be used as a debris detector as shown in FIG. 29. The device would function as a debris detector by either detecting vibration pulse delays as described in FIG. 30 or vibration spectrum frequency shifts as described in FIG. 31.

Figure 7:
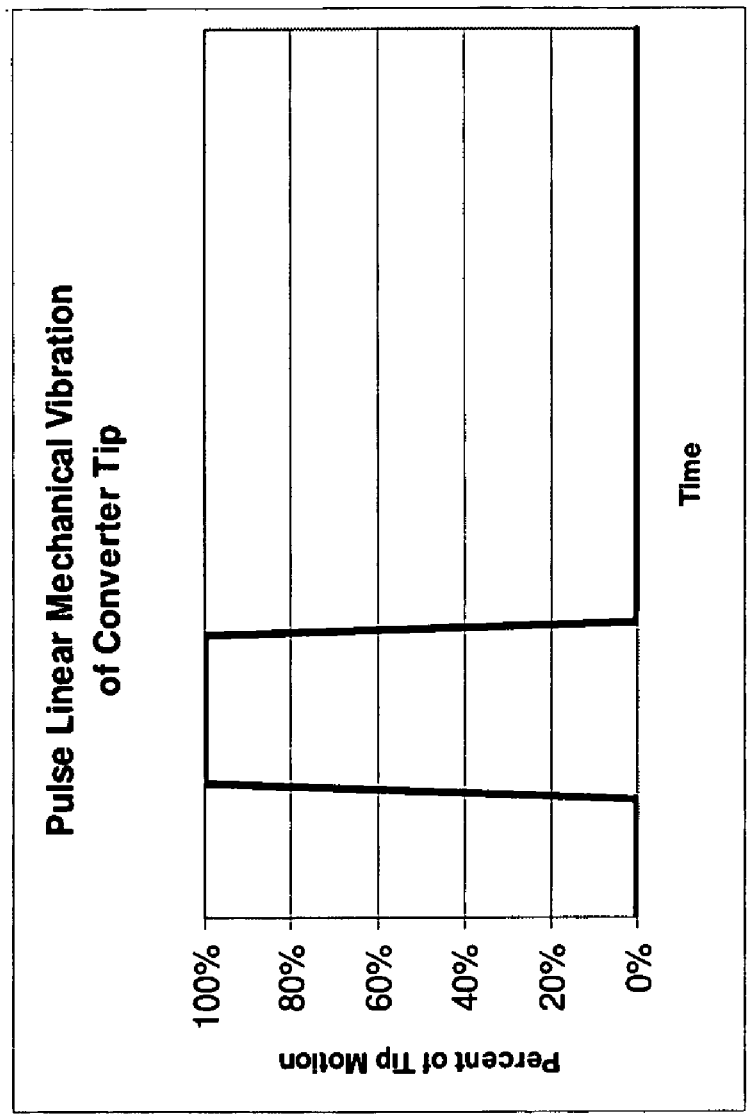
FIG. 7—Shock Pulse vibration motion at the converter sub-unit tip.

If the external energy source 4 were not turned on, then a pulsed energy source similar to one shown in FIG. 7 could be sent to the piezoelectric crystals 16 by the pulser/receiver electronic unit 44. This unit could be similar but not limited to those used in material Non Destructive Evaluation testing (NDE) such as the RITEC RPR-4000 or the JSR DPR500 electronic units. This energy source would cause the piezoelectric crystals 16 to pulse causing mechanical motion to propagate into the material 3. This mechanical motion would reflect at the end of the material 3 and return to the piezoelectric crystals 16. This returning signal would cause the piezoelectric crystals 16 to vibrate. The piezoelectric crystal 16 vibrations will create an electrical signal which would be detected by the pulser/receiver electronic unit 44. The time delay between the pulsed signal and the received signal would be measured. A known measured value of this time delay from a material 3 with no debris would be known. If this time delay were to change then it can be determine if debris 5 is present and how much debris 5 had accumulated on the material 3 surface based on the amount of time delay between the pulsed and reflected signal.

If the external energy source 4 were not turned on, then a short burst of vibratory excitation energy could be sent to the piezoelectric crystals 16 by the frequency spectrum electronic unit 44. This would cause the converter 1, coupler 2, and material 3 to vibrate. After this short burst of excitation energy, the converter 1, coupler 2, and material 3 would continue to mechanically vibrate at resonant frequencies until structural damping stopped such vibration. This mechanical vibration would be detected by the piezoelectric crystals 16 which would convert this motion into an electrical signal and be sent to the pulser/receiver and frequency spectrum electronic unit 44. The electrical signal received by the frequency spectrum electronic unit 44 from the vibrating piezoelectric crystals 16 would be broken down into its frequency spectrum. A known measured value of this frequency spectrum from a material 3 with no debris would be known. If this frequency spectrum were to change in either frequency and/or magnitude, then it could be determine if debris 5 is present and how much debris 5 had accumulated on the material 3 surface.

Figure 35:
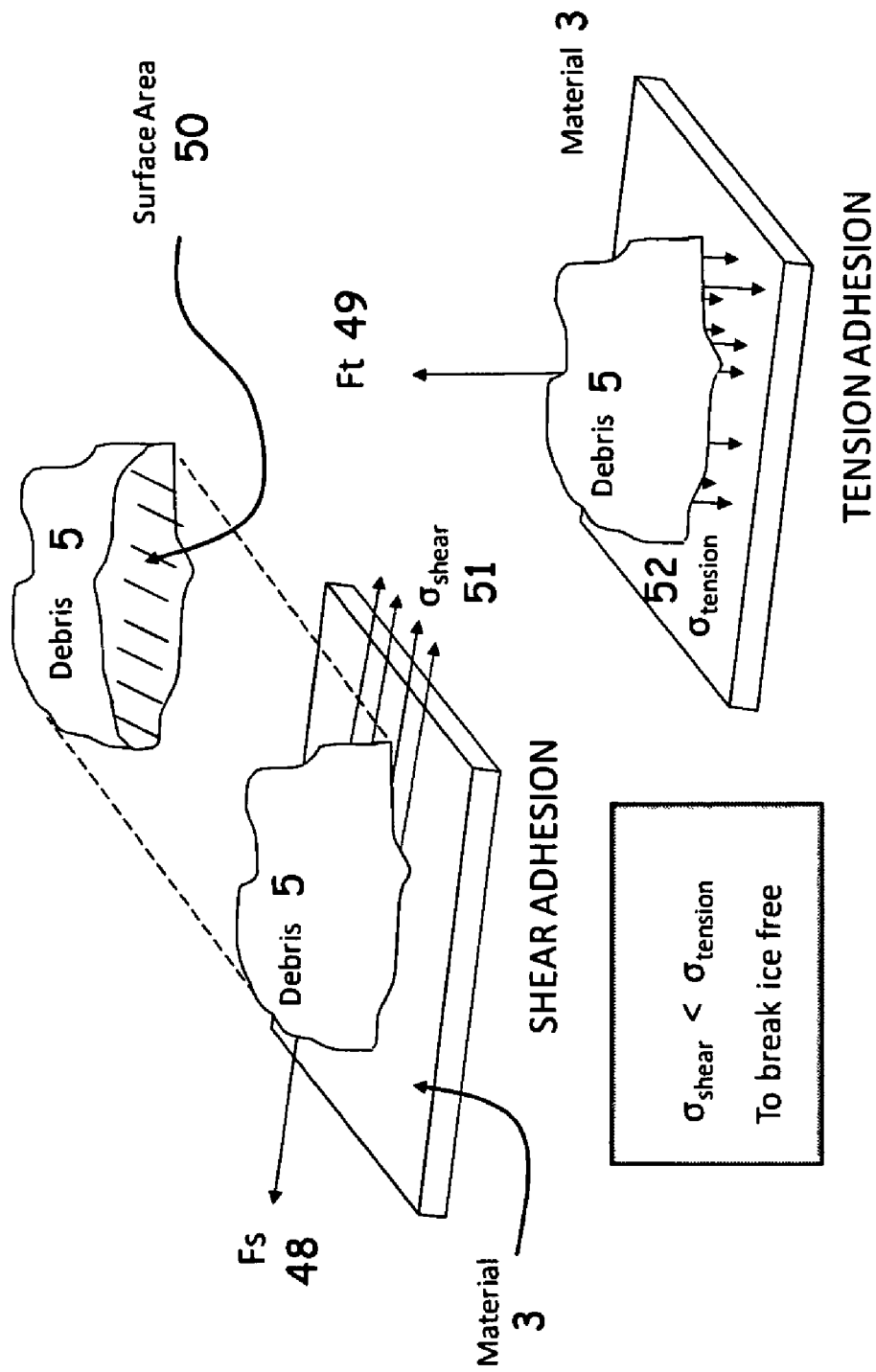
FIG. 35—Material debris shear and tension adhesion bond diagram.

Augmenting the converter and coupler unit vibration energy source: As described in the previous sections, the debris 5 is removed from a material surface 3 due to vibrations in the material surface 3. The debris 5 adhesion bond will break when either the shear strength or the tensile strength of this bond is exceeded by overcoming the maximum allowable strength at the bond location. In some applications, such as the removal of ice from a material surface 3, the debris 5 adhesion shear bond, $\sigma$shear, strength is much lower in magnitude than the adhesion tension bond, $\sigma$tension, strength as defined in FIG. 35. Thus, the most efficient way to remove debris 5, such as ice, from a material surface 3 is to overcome the adhesive shear bond strength.

Underlying Physics: To achieve this, a shearing force Fs 48 must be developed instead of a tension force Ft 49. In the application of removing debris 5, such as ice, from a material surface 3, this shearing force 48 can be achieved from Newton's Second Law which states:

$$Fs = ma \quad \text{(Equation 6)}$$

Where: Fs=shearing force 48
m=mass of the debris 5
a=acceleration of the mass of debris 5

Since the acceleration of a debris 5 mass will be used to develop the inertial shearing force Fs 48 to overcome the adhesive shearing bond $\sigma$shear 51 strength, the minimal desired removal value of the debris 5 mass, such as ice, must be known or chosen for the application. The minimal debris 5 mass value can vary depending on the desired application and is a very important variable since it is used to calculate vibration excitation frequency.

In addition to the debris 5 mass, it is also very important to know the amount of surface area 50 in which the debris 5 is in contact with the material 3 surface.

As defined in strength of materials theory, a shearing stress is defined as:

$$Fs/A = \sigma\text{shear} \quad \text{(Equation 7)}$$

Where: Fs=shearing force 48
A=the surface area 50 over which the shearing force acts
$\sigma$=shearing stress 51

Combining this relationship with Newton's Second Law results in:

$$ma/A = \sigma\text{shear} \quad \text{(Equation 8)}$$

Where: m=mass of the debris 5
a=acceleration of the mass of debris 5
A=the surface area 50 over which the shearing force acts
$\sigma$=shearing stress 51

The peak acceleration of the mass of debris 5, such as ice, is achieved by the vibration motion of the material 3 structural surface at a particular frequency. This relationship can be written mathematically for a sinusoidal vibration as follows:

$$a = \xi \omega^2 \quad \text{(Equation 9)}$$

Where: a=acceleration of the mass of debris 5
$\xi$=peak displacement of the material 3 surface due to vibrations
$\omega$=frequency of the vibratory motion.

The vibration peak displacement magnitude, 4, of the material surface 3 is achieved through the excitation of longitudinal 7, transverse 8, or both longitudinal and transverse 9 structural mode shape motion of the material 3 surface. To achieve an efficient debris removal system, it is advantageous to excite the mode shape motions 7, 8, 9 at the frequencies they naturally want to vibrate.

Thus, the adhesive shear bond of debris 5, such as ice, will be broken when the following mathematical relationship is achieved:

$$m\xi\omega^2/A > \sigma\text{shear} \quad \text{(Equation 10)}$$

Where: m=mass of the debris 5

ξ=peak displacement of the material 3 surface due to vibrations

ω=frequency of the vibratory motion.

A=the surface area 50 over which the shearing force acts

σ=shearing stress 51

To ensure that the vibrations in the material 3 do not exceed the material 3 stress and fatigue limits, the maximum allowable vibration displacement, ξ, in the material 3 must be chosen based on the material 3 fatigue and strength properties. From the previously calculated values of the minimum amount of debris 5 mass, the maximum amount of vibration displacement, ξ, allowed to occur in the material 3, the debris 5 surface area 50, and the debris 5 bond shear stress σshear 51 strength, the minimum frequency of the vibration motion is determined as follows:

$$\omega > [(\sigma shear A)/(m\xi)]^{1/2} \quad \text{(Equation 11)}$$

Where: ω=frequency of the vibratory motion.

m=mass of the debris 5

ξ=peak displacement of the material 3 surface due to vibrations

A=the surface area 50 over which the shearing force acts

σ=shearing stress 51 required to break the adhesive bond

Thus, from the above relationship, if the material 3 shearing modes of vibration 7 at frequencies equal or greater than "ω" are excited into sinusoidal motion with a displacement value of "v", then a debris 5 mass "m" with a surface area 50 of magnitude "A" will break free of the material 3 surface because the debris 5 shearing stress "σshear" 51 bond will be broken. This will be achieved without damaging the material 3.

Figure 32:
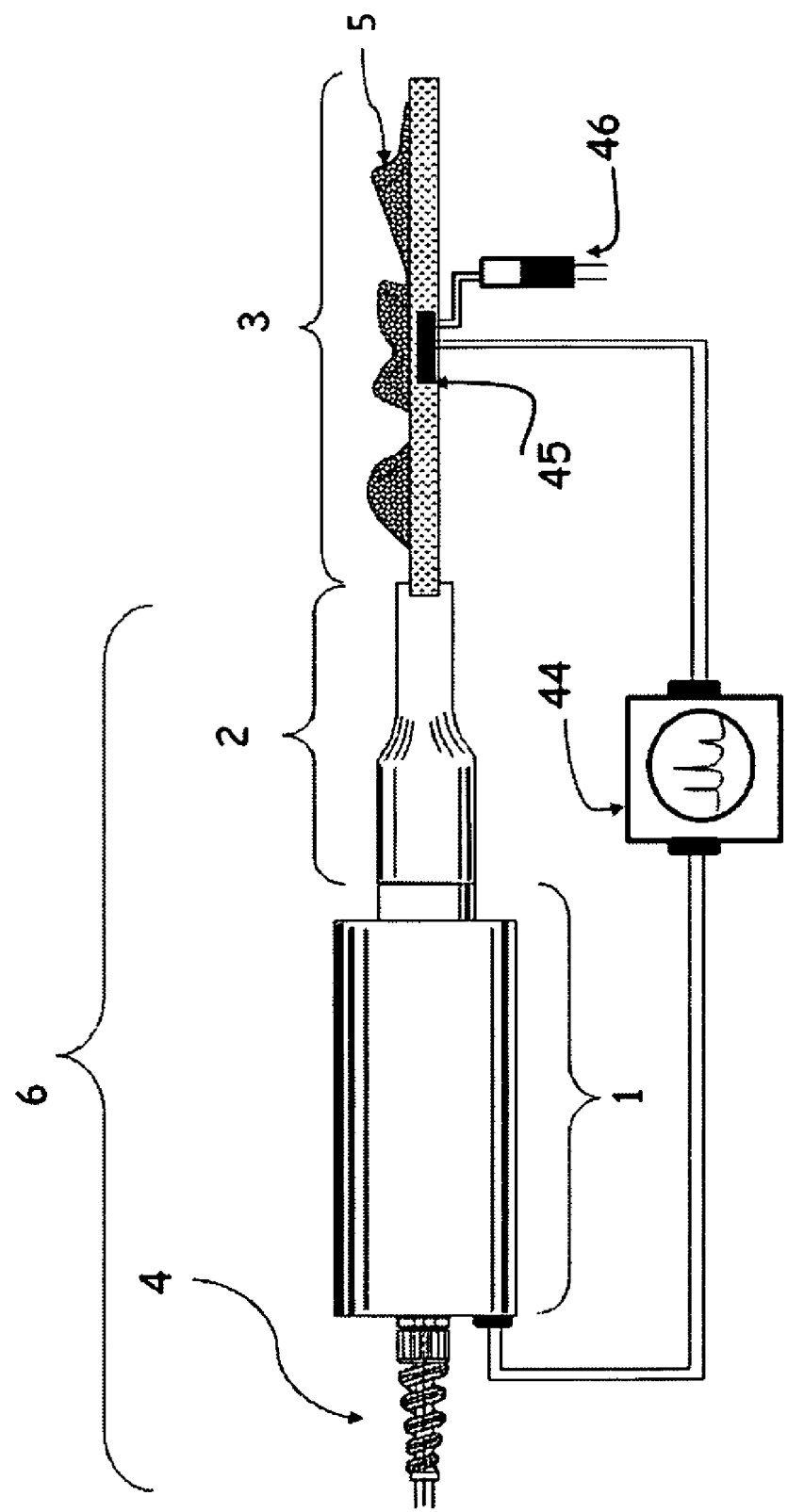
FIG. 32—Vibrating Debris Remover with a pulser/receiver and/or frequency spectrum analyzer attached to the converter sub-unit along with an embedded vibrator subunit.
Figure 33:
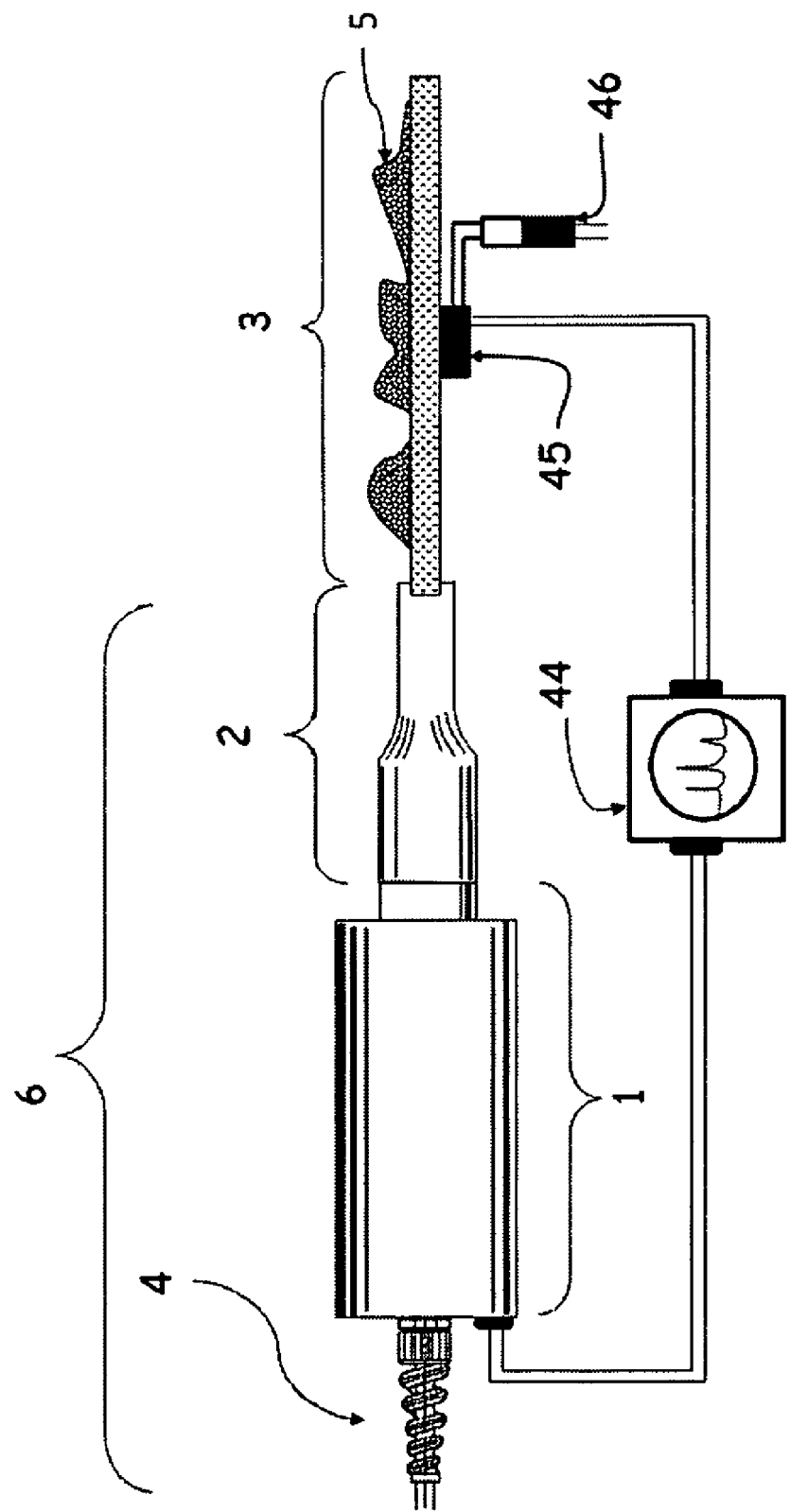
FIG. 33—Vibrating Debris Remover with a pulser/receiver and/or frequency spectrum analyzer attached to the converter sub-unit along with an vibrator subunit attached on the material surface.

Material Excitation: To excite the material 3 shearing mode shape motions 7 at the proper frequency "ω" (or greater) and displacement magnitude "ξ", the vibration energy from an excitation source will need to be introduced into the material 3. The convertor 1 and coupler 2, otherwise known as the vibrating debris remover 6, provide this excitation energy into the edge of the material 3. To either augment the converter 1 and coupler 2 units vibration energy source or to provide an alternate vibration energy source if the convertor 1 and coupler 2 units were inactive or unattached, additional vibrator subunits 45 can be attached to the underside of the material 3 as shown in FIG. 33 or embedded in the material 3 as shown in FIG. 32. As shown in FIG. 32, if the vibrator subunit 45 is embedded in the material it will attach to two edges 55 of the material 3.

If a vibrator subunit 45 or multiple units were to be used to augment or to provide alternate energy sources to excite the material 3 longitudinal structural mode shapes 7, the position of the vibrator subunit 45 is critical. If a vibrator subunit 45 is properly attached at a strategically chosen location, the material mode shape will be easily excited and the displacement values in the material 3 can be higher than those from the excitation source if the material mode is driven into resonance.

Figure 34:
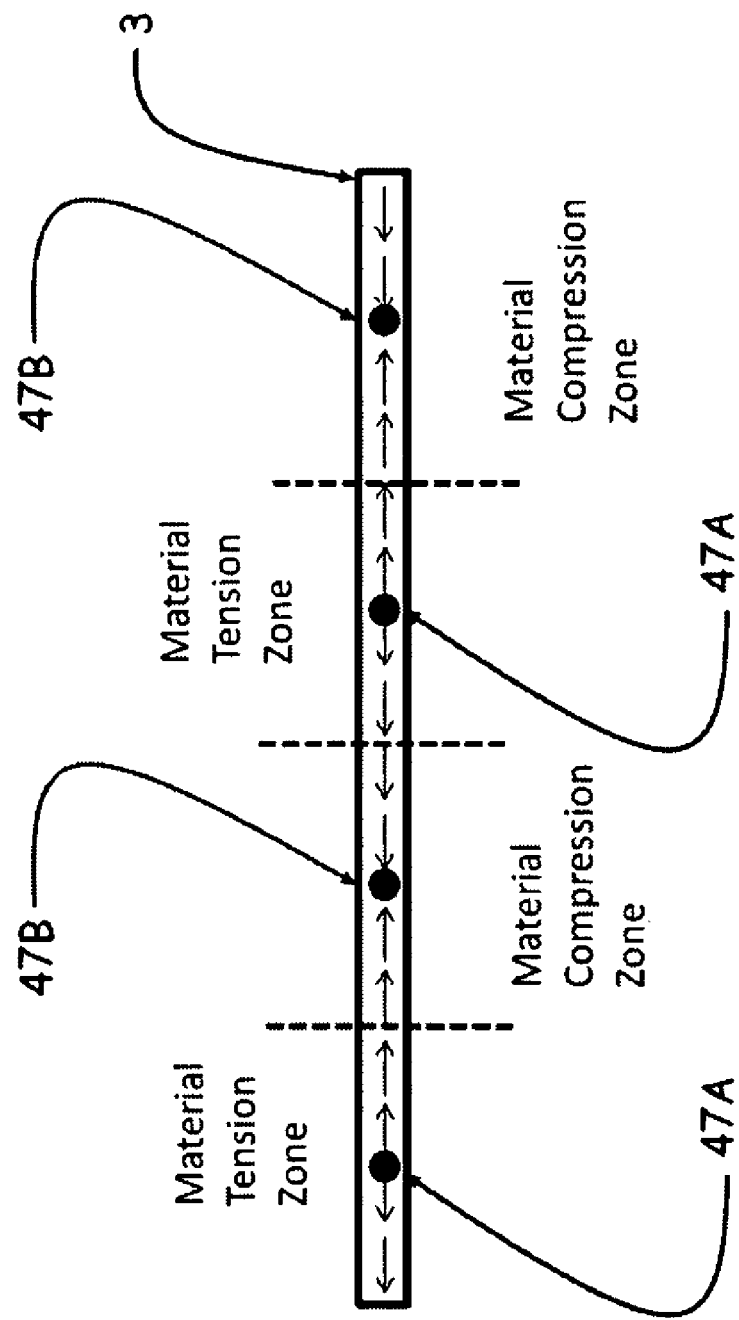
FIG. 34—Material longitudinal vibration nodal locations to place the additional vibration subunit(s)

As shown in FIG. 34, as a material 3 is excited in a longitudinal motion to create the required shearing force between the debris 5 and the material 3, there will be locations in the material 3 for which no motion occurs. These positions are called node points. At these node points, the material to either side will be moving away from the node point 47A or toward the node point 47B. It is at these node points where the vibrator subunits 45 are to be located.

Figure 36:
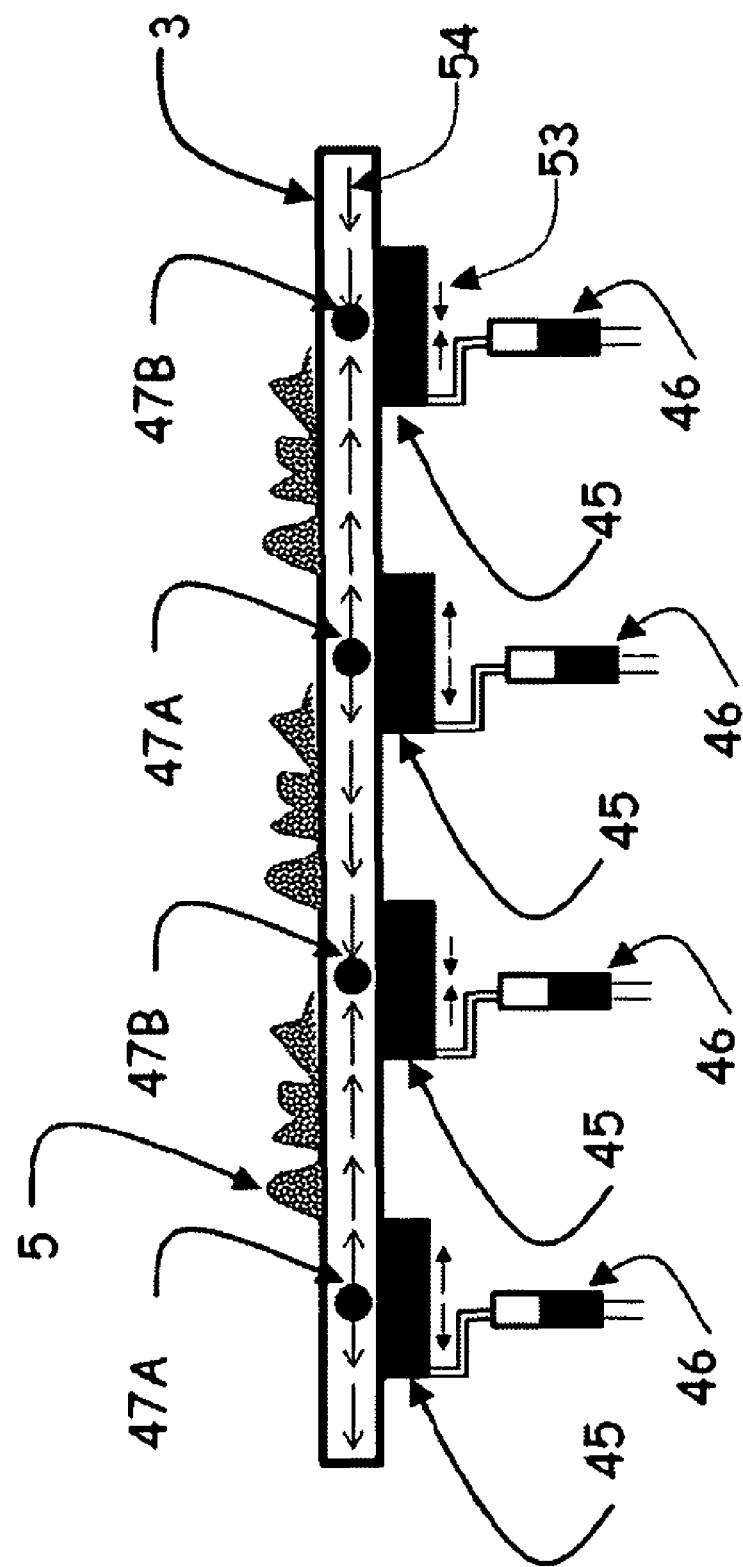
FIG. 36—Vibration Subunits placed on the surface of the material.
Figure 37:
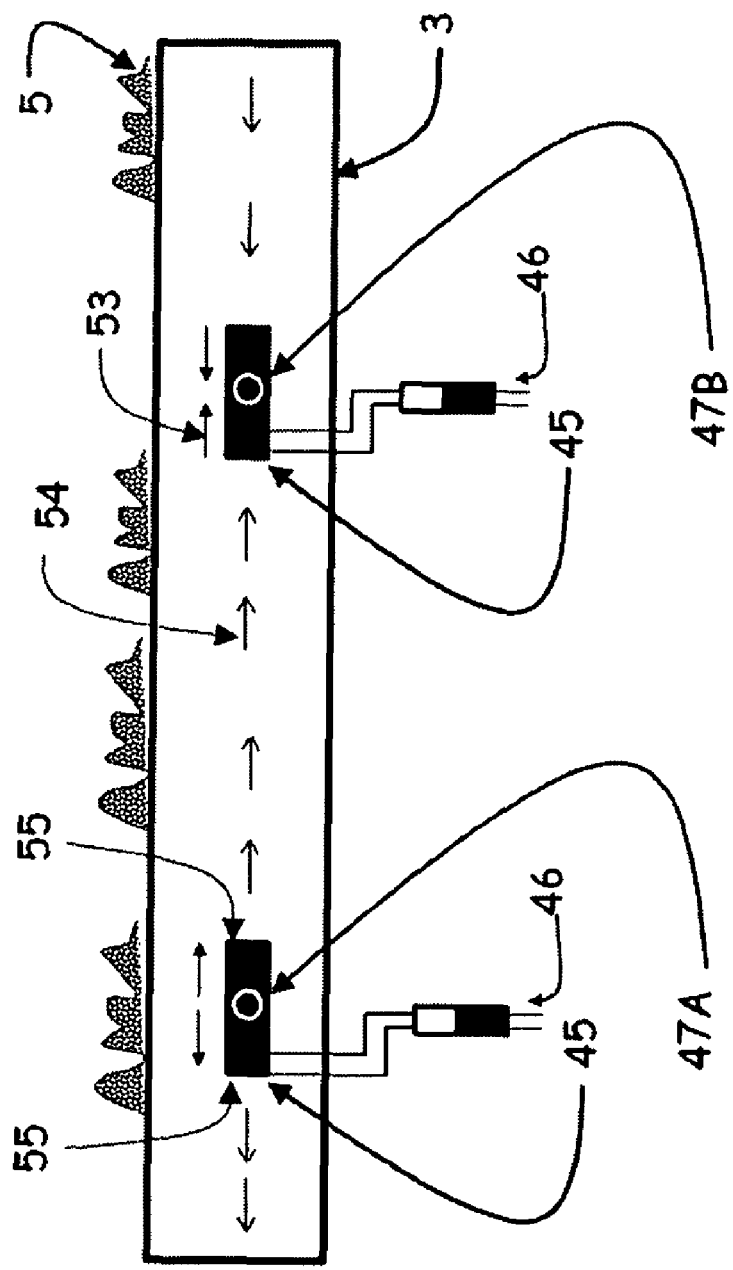
FIG. 37—Vibration Subunits placed internal to the material.

The vibration subunit 45 converts an external energy source 46 such as electrical, pneumatic, or fluid (e.g., hydraulic) into mechanical motion. An example of a vibration subunit 45 would be a piezoelectric actuator such as, but not limited to, the QuickPack QP10w model offered by Mide Technology Corporation. As an external energy source 46 is converted by the vibrator subunit 45, the vibrator subunit 45 will move 53 such that it will extend or contract. The phasing of this motion 53 must be in phase with how the material 3 is moving 54 at these node points 47A and 47B. As is shown in FIG. 36 and FIG. 37 if the vibration subunit 45 has the same motion 53 as the material 54, the material 3 will vibrate and as resonance is reached in the material 3, the material motion 54 will be amplified such that it is greater than the motion 53 of the vibrator subunit 45. This amplification is related to the type of properties of the material 3. Greatest amplification can be expected from a metallic material 3 such as stainless steel.

In FIG. 36, the vibrator subunit 45 transmits its motion 53 into the material 3 by a shearing action at the interface between them. This interface, which could take the form of epoxy adhesive, must be chosen such that it efficiently transmits the vibration subunit 45 motion 53 into the material 3.

In FIG. 37, the vibrator subunit 45 transmits its motion 53 into the material 3 at two edges 55. As the vibrator subunit 45 extends and contracts, the forces at the edges 55 will cause the material 3 to vibrate with motion 54. In addition to the forces at the edges 55, there will also be motion 53 transmitted into the material 3 through a shearing action between the vibrator subunit 45 and the material 3. This application is most effective for a composite material 3 in which the vibration subunit 45 can be embedded in the composite material 3 layup at the time of formation.

Figure 38:
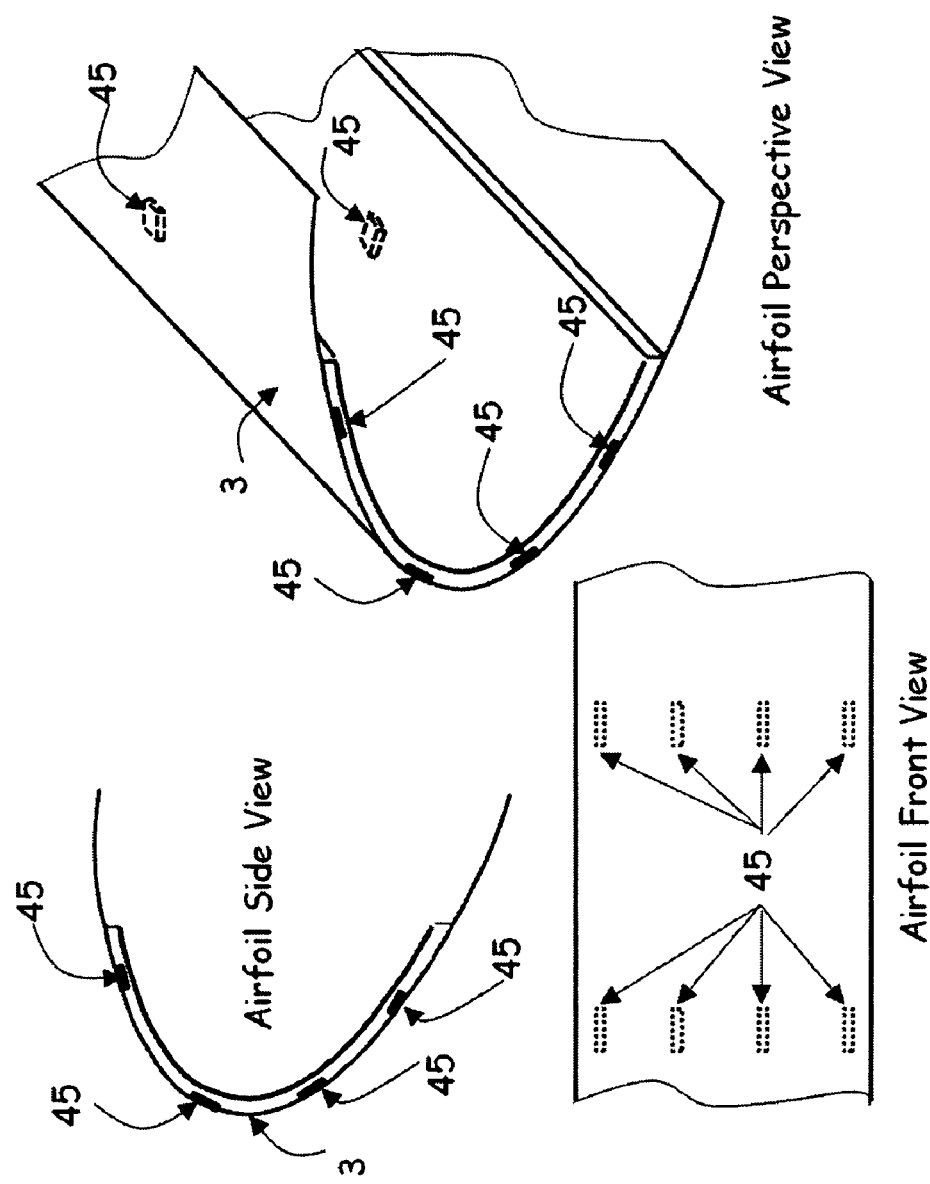
FIG. 38—Vibration Subunits concept for an airfoil.

Unlike the need to impedance match the coupler 2 and the material 3 for an efficient system to be designed, there is no impedance matching requirement between the material 3 and the vibrator subunit 45. This is a result of the vibrator subunits 45 being placed directly at the nodal points 47A and 47B and that the motion 53 in the vibrator subunit 45 is enforced on the material 3 such that the material motion 54 matches the motion 53 of the vibrator subunit 45 at all times. The number of vibrator subunits 45 will depend on the material 3 properties such as but not limited to damping, voids, and the ability to transmit vibration waves. A concept of the vibration subunits 45 integrated into an airfoil structure is shown in FIG. 38 without the external energy sources 46 shown.

Vibration Subunits used as Debris Detectors: If the vibration subunits 45 utilize a piezoelectric crystal to convert electrical energy 46 into mechanical motion 53, it could also be attached to a pulser/receiver and/or a frequency spectrum electronic unit 44 to be used as a debris detector as shown in FIG. 32 and FIG. 33. The device would function as a debris detector by either detecting vibration pulse delays similar as described in FIG. 30 or similar vibration spectrum frequency shifts as described in FIG. 31.

Vibration Subunits used as Structural Damage Detectors: If the vibration subunits 45 utilize a piezoelectric crystal to convert electrical energy 46 into mechanical motion 53, it could also be attached to a pulser/receiver and/or a frequency spectrum electronic unit 44 to be used as a structural damage detector as shown in FIG. 32 and FIG. 33. The device would function as a structural damage detector by either detecting vibration pulse delays similar as described in FIG. 30 or similar vibration spectrum frequency shifts as described in FIG. 31.

Vibration Subunits used as Energy Harvesters: If the vibration subunits 45 utilize a piezoelectric crystal to convert electrical energy 46 into mechanical motion 53, then the reverse affect could also be utilized. If the material 3 were to be flexed or vibrated from some external force, such as air pressure, then as the material 3 deflects, the vibration subunits 45 will generate and electrical charge. This electrical charge could be stored in a capacitor type unit and used later to power the vibration subunits 45. Such an energy storage capability would be similar, but not limited, to the Volture™ Piezoelectric Energy Harvester devices as offered by Mide Technology Corporation or any other type of piezoelectric based devices.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A system for removing debris from a surface, said system comprising:
    a material from which debris is to be removed, said material having a front surface configured to have debris attached thereto, and an opposing back surface;
    at least one vibration subunit operatively connected to said opposing back surface and configured to convert a driving energy to a vibrating mechanical output energy which is coupled into said material; and
    at least one external energy source connected to said at least one vibration subunit, said at least one external energy source configured to provide said driving energy to said at least one vibration subunit.

2. The system of claim 1 further comprising:
    a converter unit configured to produce mechanical motion at an output; and
    a coupler having a first end and a second end, the first end being operatively associated with the converter output and configured to transmit the mechanical motion produced by the converter unit, the second end being adapted to attach to an edge of the material.

3. The system of claim 1 further comprising a pulser/receiver unit or a frequency spectrum electronic unit operatively connected to said at least one vibration subunit and configured to detect at least one of debris on said front surface of said material and damage to said material.

4. The system of claim 2 further comprising a pulser/receiver unit or a frequency spectrum electronic unit operatively connected to said converter unit and configured to detect at least one of debris on said front surface of said material and damage to said material.

5. The system of claim 1 wherein said at least one vibration subunit includes a piezoelectric actuator device configured to convert electrical energy provided by said at least one external energy source to vibrating mechanical energy.

6. The system of claim 1 wherein said at least one vibration subunit includes a pneumatic actuator device configured to convert pneumatic energy provided by said at least one external energy source to vibrating mechanical energy.

7. The system of claim 1 wherein said at least one vibration subunit includes a hydraulic actuator device configured to convert hydraulic energy provided by said at least one external energy source to vibrating mechanical energy.

8. The system of claim 1 wherein said material forms one of at least a portion of a windshield, at least a portion of an aircraft wing or tail, at least a portion of an air foil, at least a portion of a wind turbine blade, at least a portion of a helicopter rotor blade, and at least a portion of a refrigeration coil cooling fin.

9. The system of claim 1 wherein said at least one vibration subunit is operatively connected at a vibration node of said material on said opposing back surface.

10. The system of claim 1 wherein said debris includes ice.

11. The system of claim 1 wherein said material includes at least one of glass, metal, and a composite substance.

12. The system of claim 5 wherein said piezoelectric actuator device is further configured to convert deflecting mechanical energy, provided by said material, to electrical energy and storing said electrical energy.

13. A system for removing debris from a surface, said system comprising:
    a material from which debris is to be removed, said material having a front surface configured to have debris attached thereto;
    at least one vibration subunit operatively embedded within said material and configured to convert a driving energy to a vibrating mechanical energy which is coupled into said material; and
    at least one external energy source connected to said at least one embedded vibration subunit, said at least one external energy source configured to provide said driving energy to said at least one embedded vibration subunit.

14. The system of claim 13 further comprising:
    a converter unit configured to produce mechanical motion at an output; and
    a coupler having a first end and a second end, the first end being operatively associated with the converter output and configured to transmit the mechanical motion produced by the converter unit, the second end being adapted to attach to an edge of the material.

15. The system of claim 13 further comprising a pulser/receiver unit or a frequency spectrum electronic unit operatively connected to said at least one embedded vibration subunit and configured to detect at least one of debris on said front surface of said material and damage to said material.

16. The system of claim 14 further comprising a pulser/receiver unit or a frequency spectrum electronic unit operatively connected to said converter unit and configured to detect at least one of debris on said front surface of said material and damage to said material.

17. The system of claim 13 wherein said at least one embedded vibration subunit includes a piezoelectric actuator device configured to convert electrical energy provided by said at least one external energy source to vibrating mechanical energy.

18. The system of claim 13 wherein said at least one embedded vibration subunit includes a pneumatic actuator device configured to convert pneumatic energy provided by said at least one external energy source to vibrating mechanical energy.

19. The system of claim 13 wherein said at least one embedded vibration subunit includes a hydraulic actuator device configured to convert hydraulic energy provided by said at least one external energy source to vibrating mechanical energy.

20. The system of claim 13 wherein said material forms one of at least a portion of a windshield, at least a portion of an aircraft wing or tail, at least a portion of an air foil, at least a portion of a wind turbine blade, at least a portion of a helicopter rotor blade, and at least a portion of a refrigeration coil cooling fin.

21. The system of claim 13 wherein said at least one vibration subunit is operatively embedded at a vibration node within said material.

22. The system of claim 13 wherein said debris includes ice.

23. The system of claim 13 wherein said material includes at least one of glass, metal, and a composite substance.

24. The system of claim 17 wherein said piezoelectric actuator device is further configured to convert deflecting mechanical energy, provided by said material, to electrical energy and storing said electrical energy.

25. A retrofit kit for removing debris from a material forming at least one of a windshield, an aircraft wing or tail, an air foil, a wind turbine blade, a helicopter rotor blade, and a refrigeration coil cooling fin, said retrofit kit comprising:
- a plurality of vibration subunit kit elements adapted to be operatively connected to a back surface of said material and configured to convert to be a driving energy to a vibrating mechanical output energy which is coupled into said material for removing debris from said material;
- an adhesive kit element configured to mechanically and acoustically couple said plurality of vibration subunit kit elements to said material;
- at least one external energy source kit element configured to be connected to said plurality of vibration subunit kit elements, said at least one external energy source kit element capable of providing said driving energy to said plurality of vibration subunit kit elements; and
- a plurality of connector kit elements to connect said at least one external energy source kit element to said plurality of vibration subunit kit elements to channel said driving energy from said at least one external energy source kit element to said plurality of vibration subunit kit elements.

26. The retrofit kit of claim 25 further comprising:
- a converter unit kit element to produce mechanical motion at an output; and
- a coupler kit element having a first end and a second end, the first end being operatively associated with the converter output and configured to transmit the mechanical motion produced by the converter unit kit element, the second end being adapted to attach to an edge of the material.

27. The retrofit kit of claim 25 further comprising a pulser/receiver unit kit element or a frequency spectrum electronic unit kit element configured to be operatively connected to at least one of said plurality of vibration subunit kit elements and configured to detect at least one of debris on a surface of said material and damage to said material.

28. The retrofit kit of claim 26 further comprising a pulser/receiver unit kit element or a frequency spectrum electronic unit kit element configured to be operatively connected to said converter unit kit element and configured to detect at least one of debris on a surface of said material and damage to said material.

29. The retrofit kit of claim 25 wherein said plurality of vibration subunit kit elements are configured to be operatively connected at vibration nodes of said material on said back surface.

\* \* \* \* \*